INVENTORS
ROBERT J. JAUCH AND
CHRISTIAN W. KRUCKEBERG
BY
Edmund N.E. Kamm
ATTORNEY

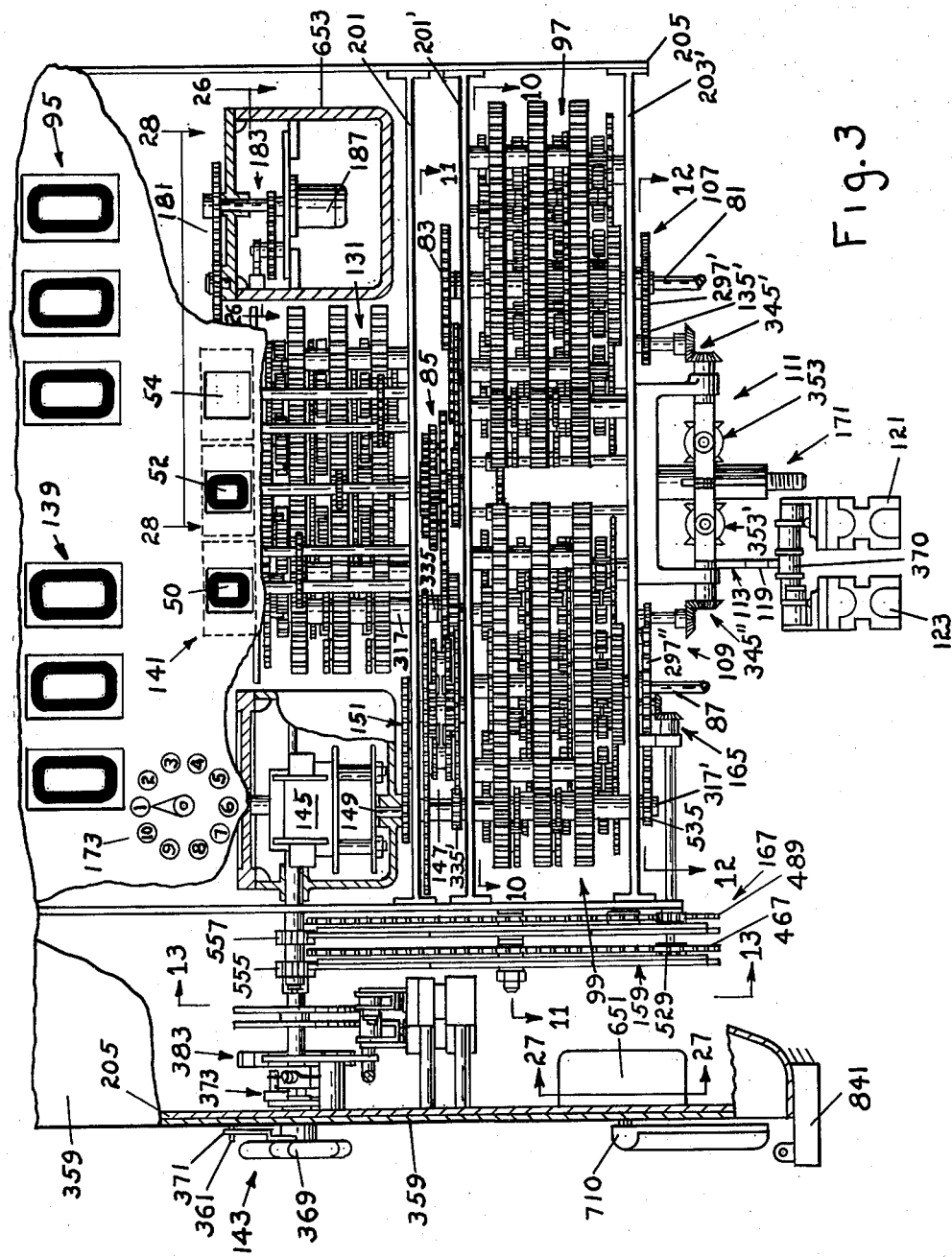

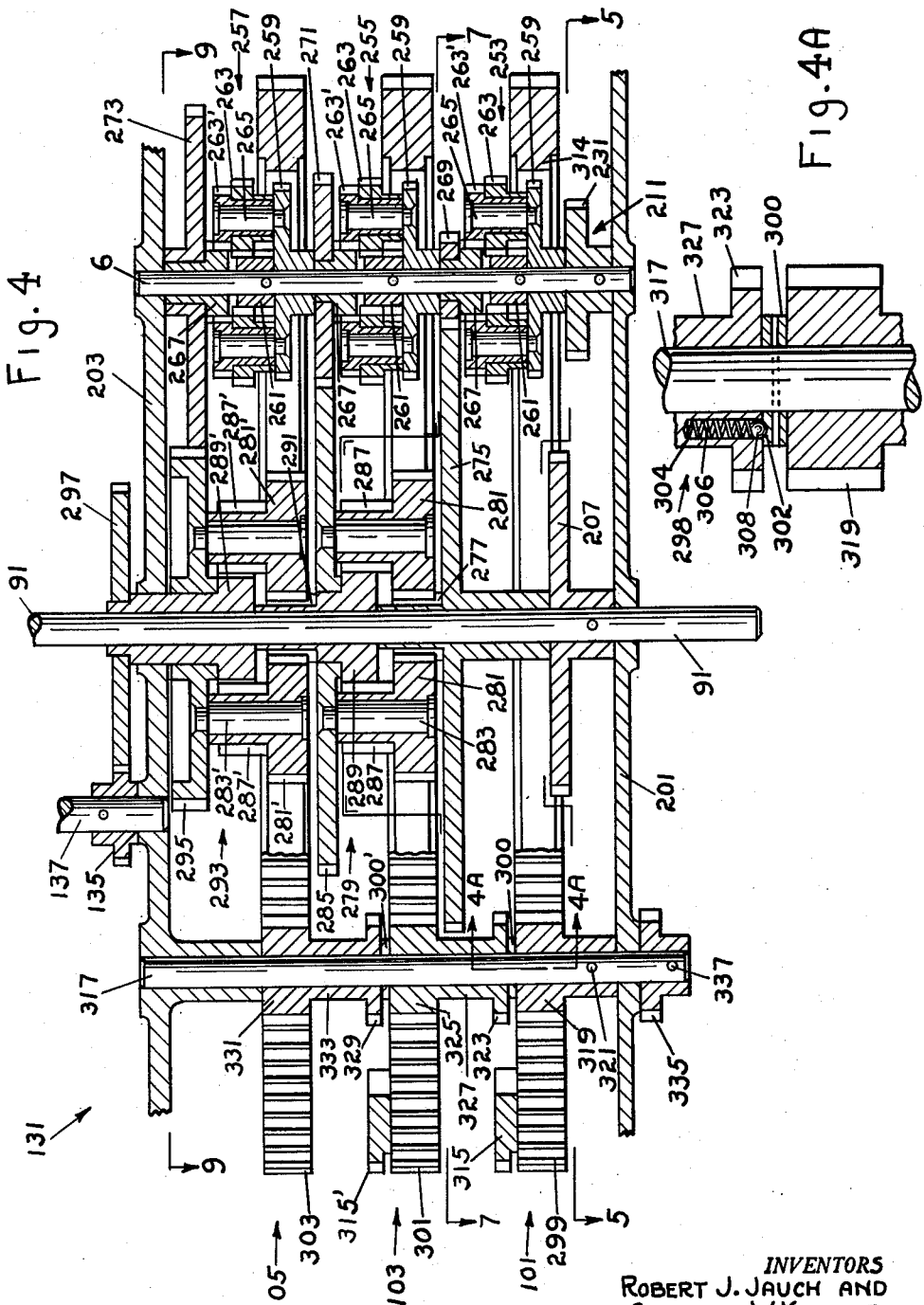

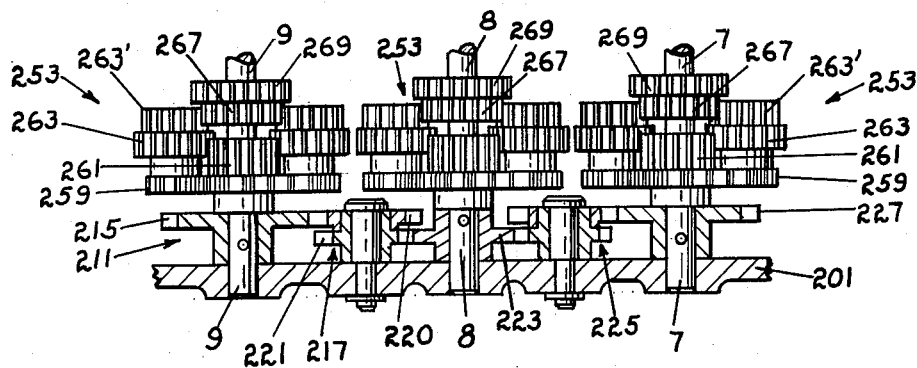
Fig. 6
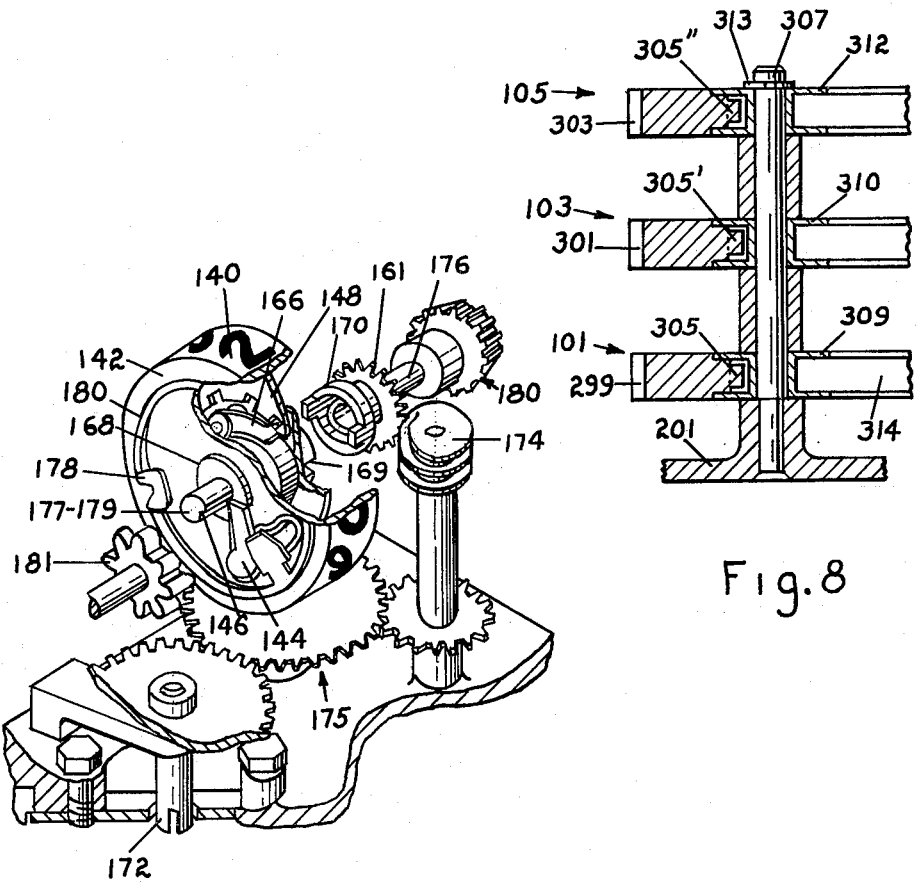
Fig. 8
Fig. 30

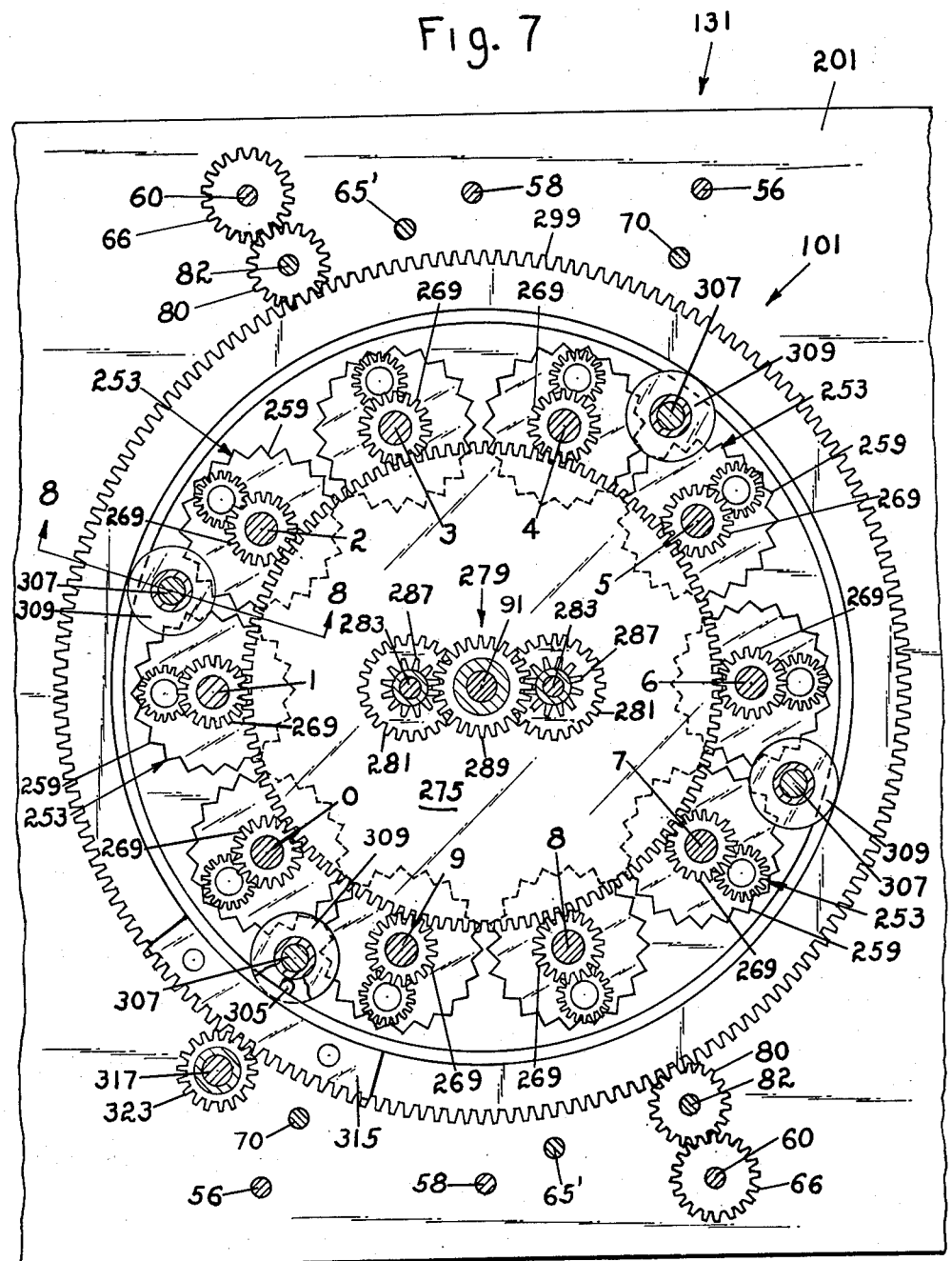

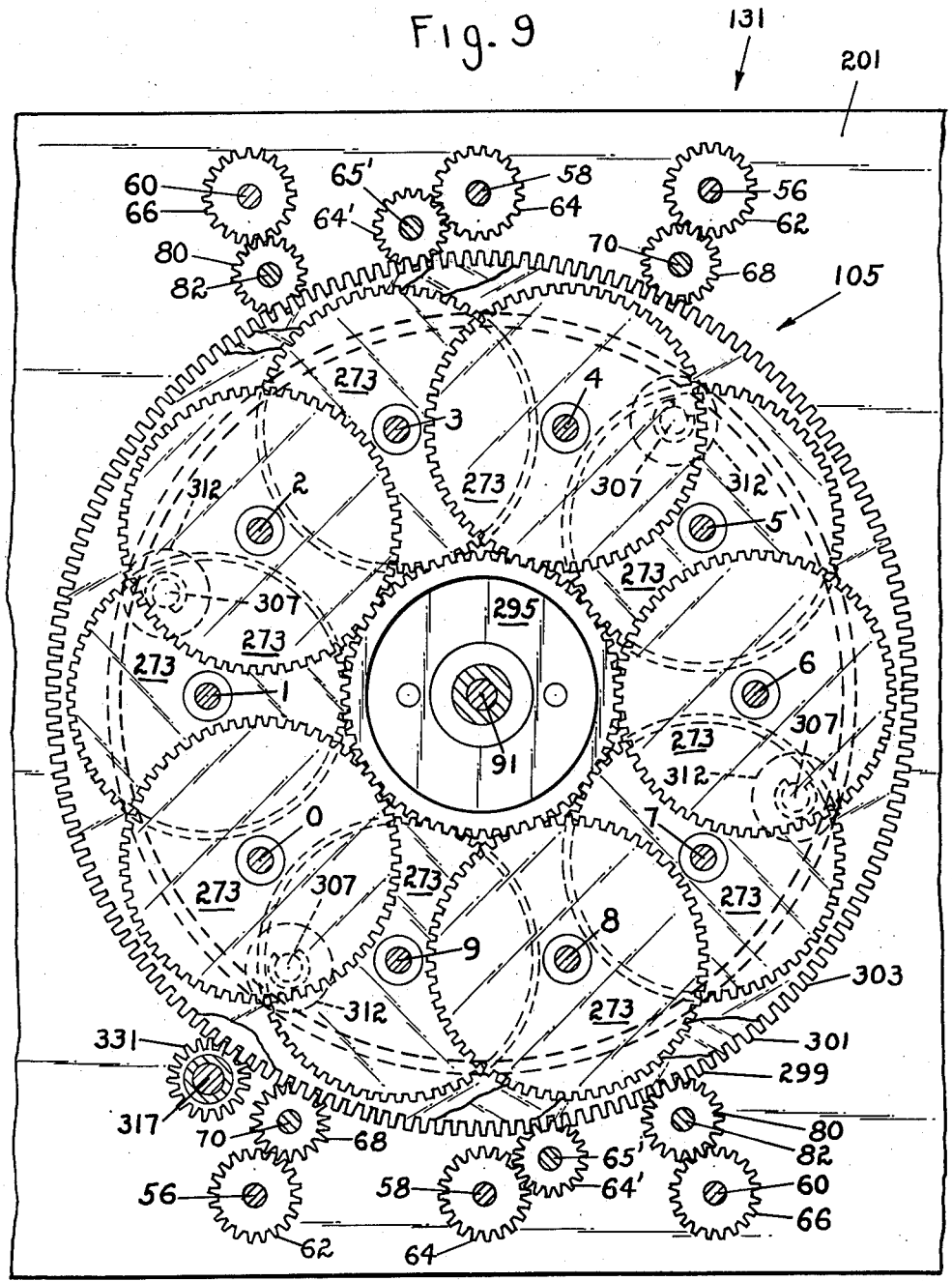

Oct. 13, 1964

R. J. JAUCH ETAL 3,152,724

APPARATUS FOR DISPENSING AND PRICING
SELECTED BLENDS OF TWO LIQUIDS

Filed July 3, 1961

INVENTORS
ROBERT J. JAUCH AND
BY CHRISTIAN W. KRUCKEBERG

ATTORNEY

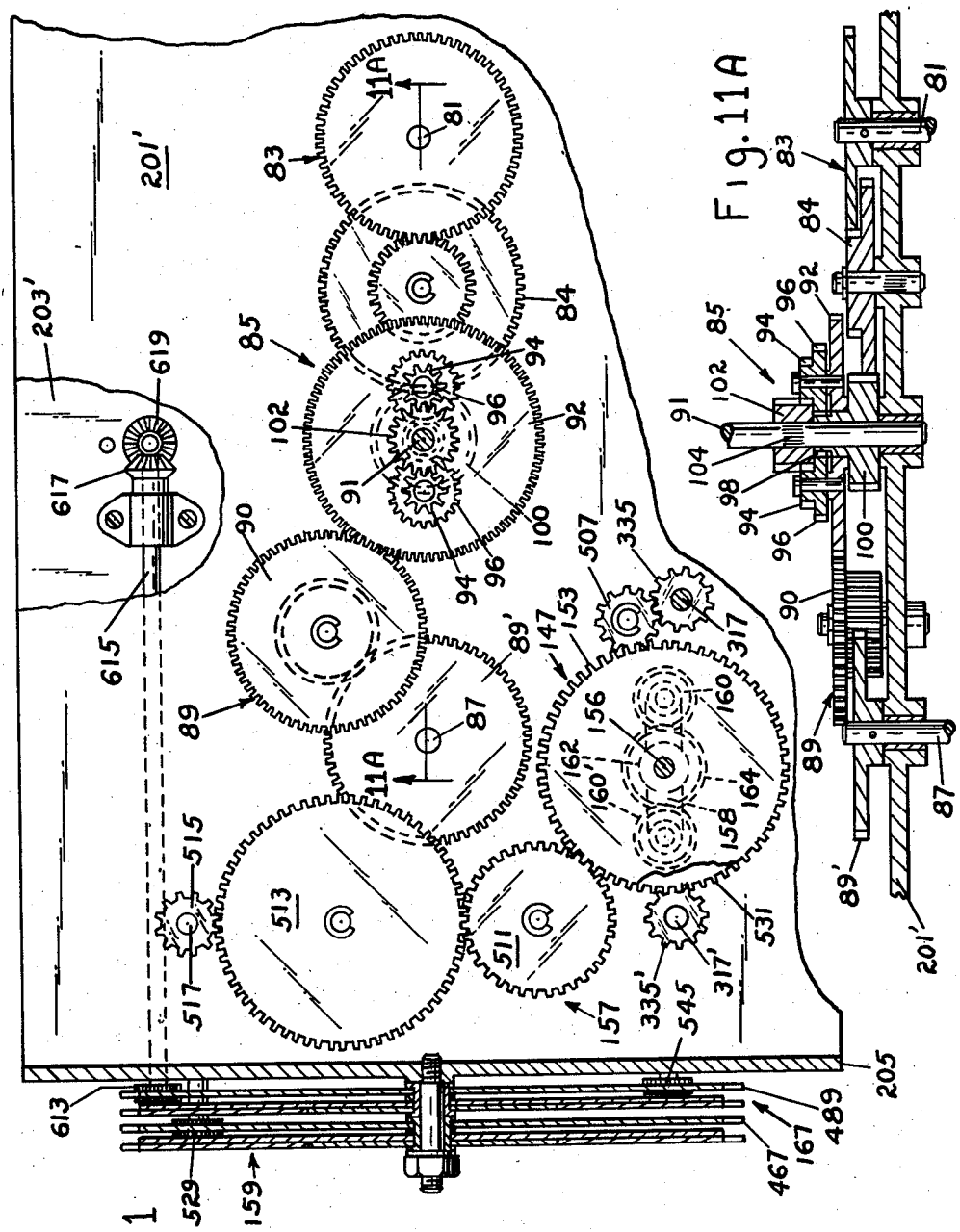

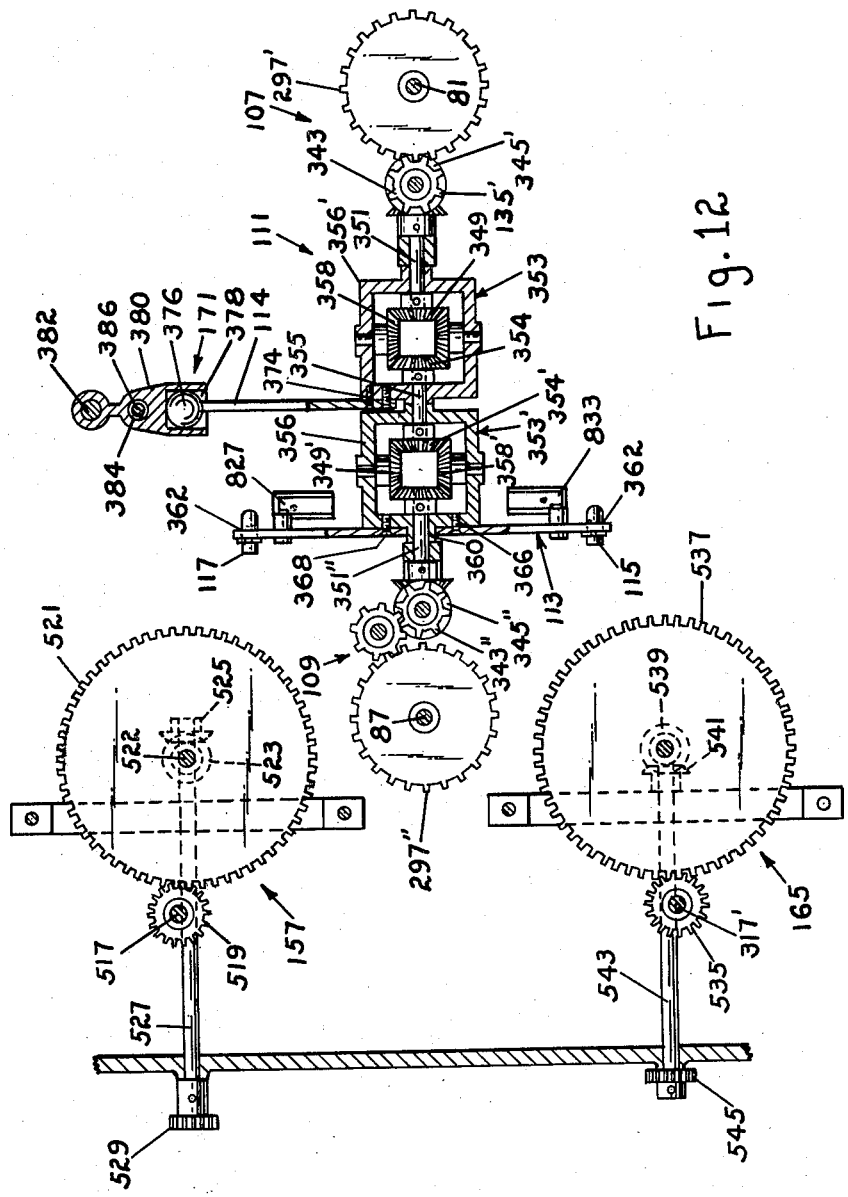

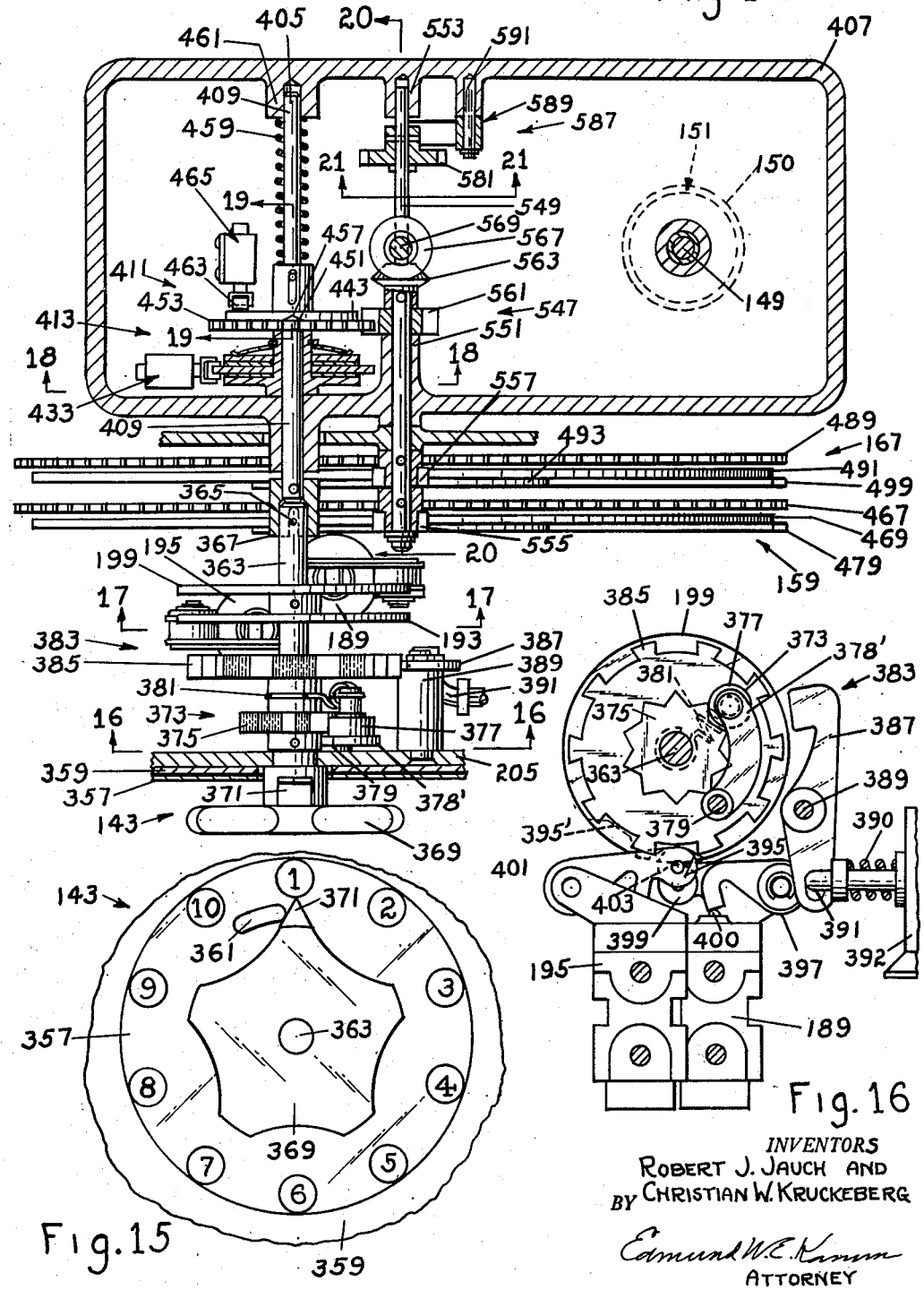

Oct. 13, 1964 R. J. JAUCH ETAL 3,152,724
APPARATUS FOR DISPENSING AND PRICING
SELECTED BLENDS OF TWO LIQUIDS
Filed July 3, 1961 16 Sheets-Sheet 14
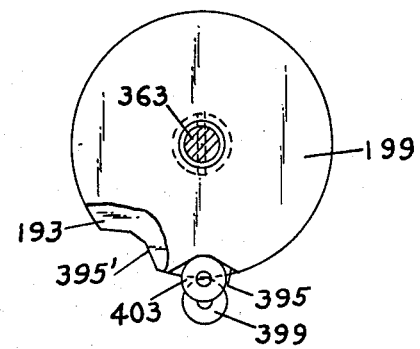
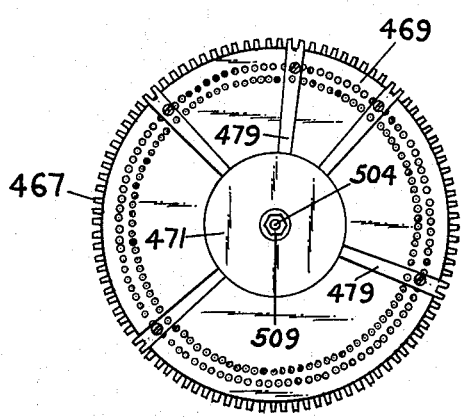
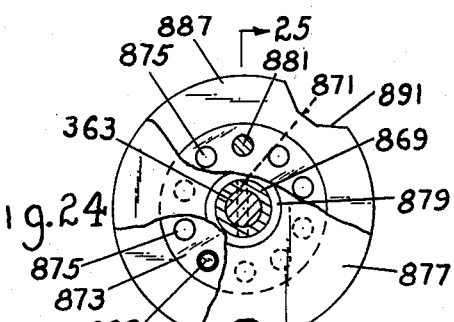
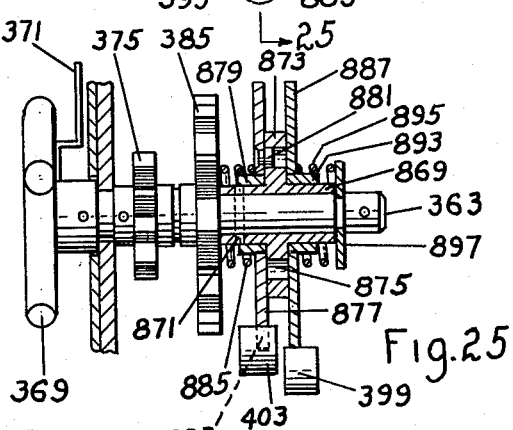
INVENTORS
ROBERT J. JAUCH AND
BY CHRISTIAN W. KRUCKEBERG
ATTORNEY

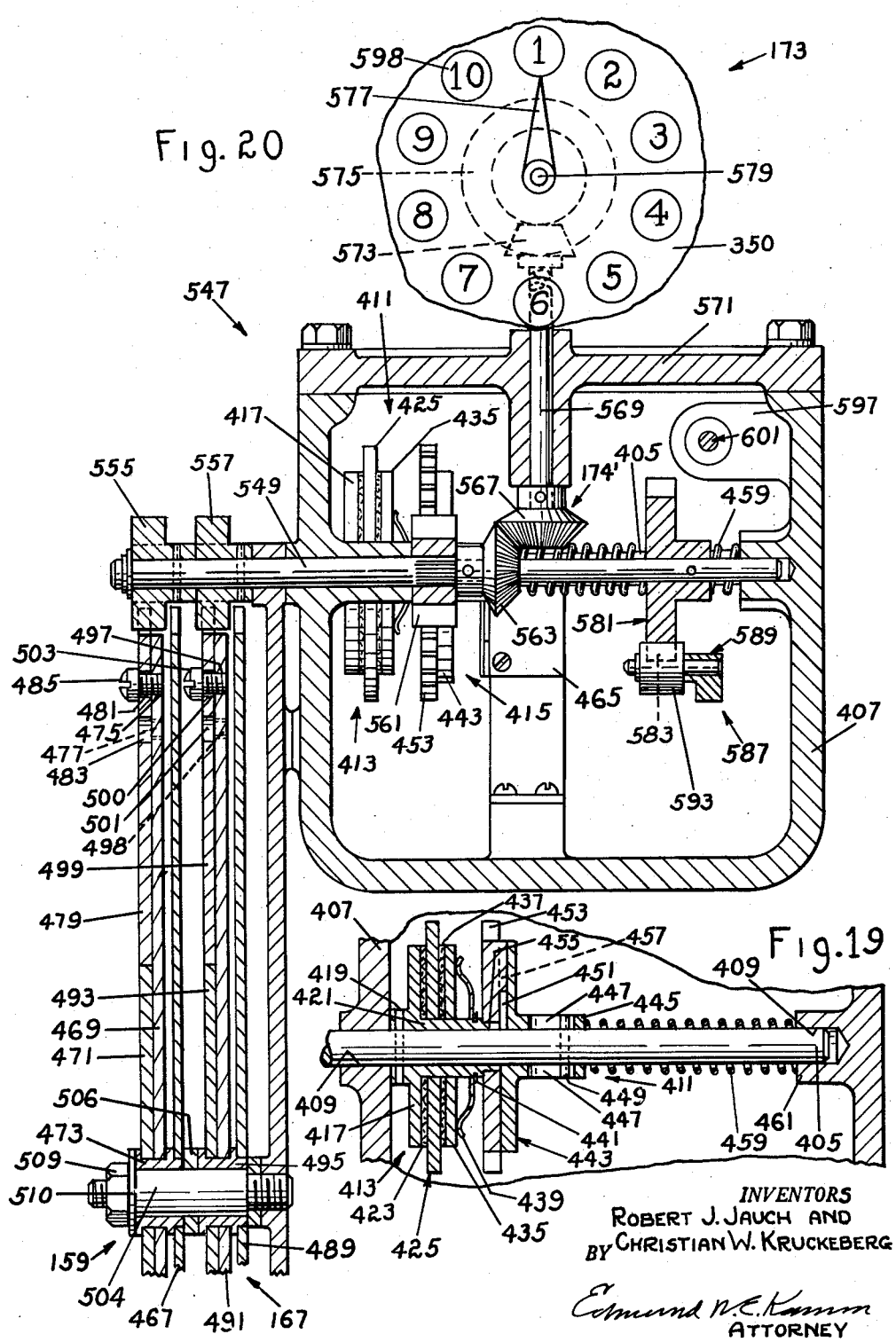

Oct. 13, 1964       R. J. JAUCH ETAL       3,152,724
APPARATUS FOR DISPENSING AND PRICING
SELECTED BLENDS OF TWO LIQUIDS
Filed July 3, 1961                    16 Sheets-Sheet 16

INVENTORS
ROBERT J. JAUCH AND
BY CHRISTIAN W. KRUCKEBERG

Edmund W. E. Kamm
ATTORNEY

United States Patent Office 3,152,724
Patented Oct. 13, 1964

3,152,724
APPARATUS FOR DISPENSING AND PRICING
SELECTED BLENDS OF TWO LIQUIDS
Robert J. Jauch and Christian W. Kruckeberg, Fort
Wayne, Ind., assignors to Tokheim Corporation, Fort
Wayne, Ind., a corporation of Indiana
Filed July 3, 1961, Ser. No. 121,548
52 Claims. (Cl. 222—26)

This invention relates to apparatus for dispensing either of two liquids or a selected blend thereof and computing the cost of the quantity of the particular liquid or blend dispensed at the predetermined price for such liquid or blend.

More specifically, it relates to apparatus for dispensing either a high octane or a low octane motor fuel or a selected blend thereof and continuously computing the cost of the quantity dispensed by multiplying the predetermined unit price thereof by the quantity dispensed.

The majority of automotive service stations dispense two grades of gasoline, differing primarily in octane ratings and price. However, the engines in use today vary so widely in compression ratios that two grades are inadequate for serving all of these engines. The problem is further complicated in that some motorists demand top performance from their cars with fuel costs a secondary consideration while others demand fuel economy and are willing to compromise on performance.

It is, in many cases, economically impractical to multiply the storage and dispensing facilities at each retail outlet to provide the number of additional grades required, therefore it is an object of this invention to provide apparatus for selectively blending two grades of gasoline, as they are dispensed, to provide up to eight additional grades of fuel.

It is a further object of the invention to provide a variator which can be used for proportioning or for price computation and which can be adjusted to any one of its available speed ratios by merely rotating a shaft in one direction or the other.

It is another object of this invention to indicate to the customer the grade of fuel being dispensed and the unit price for that grade.

It is another object of this invention to indicate to the customer the number of units dispensed.

It is still another object of this invention to indicate to the customer the computed cost of the fuel as it is dispensed.

It is still another object of this invention to provide interlock means which render the apparatus inoperative until the volume and cost registers are reset to zero.

It is still another object to provide limit controls which will stop delivery if the selected proportions are not maintained during dispensing.

It is still another object of this invention to provide power operated means for resetting the price and volume registers.

It is still another object of this invention to provide motorized means for setting the blend proportioning mechanism and price computing mechanism.

These and other objects will become apparent from a study of this specification and the drawings which are attached hereto, made a part hereof and in which:

FIGURE 3 is an elevation of the blend control and cost computing portions of the blender.

FIGURE 4 is an elevation, with parts in section, of the basic variator which is used for both cost computation and for maintaining the proportion of the constituents of the various blends.

FIGURE 4A is an enlarged sectional view of a portion of the transfer mechanism.

FIGURE 6 is a partial elevation of the gear train of the basic variator taken on the line 6—6 of FIGURE 5.

FIGURE 7 is a section taken on the line 7—7 of FIGURE 4 showing one speed change mechanism of the basic variator and a portion of the transfer apparatus for causing one speed change mechanism to move an adjacent speed change mechanism stepwise.

FIGURE 8 is a sectional view taken on the line 8—8 of FIGURE 7 showing the roller support means for the ring gear of each speed change mechanism and the carrier locking lugs of such gears.

FIGURE 9 is a section taken on the line 9—9 of FIGURE 4 showing the gearing from the tens speed change mechanism to the output from the variator.

FIGURE 11 is a section taken on the line 11—11 of FIGURE 3 showing the gear trains for totalling the gallons output from the meters, for setting the blend and cost variators and a part of the train which drives the stop mechanism.

FIGURE 11A is a section taken on the line 11A—11A of FIGURE 11 showing the gallons adding differential in detail.

FIGURE 12 is a sectional view taken on the line 12—12 of FIGURE 3 showing the gearing which connects the blend variators to the proportioning valve linkage, part of the gear trains for driving the stop mechanism and a portion of the apparatus for prepositioning the valve linkage.

FIGURE 14 is a section taken on the line 14—14 of FIGURE 13 showing the blend selector mechanism and parts of the blend and price setting stop mechanism.

FIGURE 15 is an elevation of the blend selector knob, pointer and dial as viewed from the bottom of FIGURE 14.

FIGURE 16 is a section taken on the line 16—16 of FIGURE 14 showing the blend selector centering and locking mechanisms and the selector valves for Hifuel or Lofuel delivery.

FIGURE 17 is a partial section taken on the line 17—17 of FIGURE 14 showing the cams for selecting either Hifuel or Lofuel.

FIGURE 19 is a section taken on the line 19—19 of FIGURE 14 showing a portion of the price and proportion presetting mechanism.

FIGURE 20 is a sectional elevation taken on the line 20—20 of FIGURE 14 showing additional parts of the price and blend setting stop mechanism and the customer blend indicator.

FIGURE 22 is a modified form of selector knob and dial similar to that shown in FIGURE 15.

FIGURE 23 is a modified form of either a blend or a price setting stop plate for use with the apparatus of FIGURE 22.

FIGURE 24 is an elevation of a modified cam mechanism similar to FIGURE 17 wherein the cams may be rotated relative to each other.

FIGURE 25 is a section taken on the line 25—25 of FIGURE 24.

FIGURE 30 is an isometric view of a gallons or cost register.

GENERAL DESCRIPTION

Separate storage tanks (not shown) are provided for a high octane and a low octane motor fuel, hereinafter designated as "Hifuel" and "Lofuel" for convenience. Furthermore, it is desirable that either of these fuels may be dispensed separately or be blended in selected ratios. The blending takes place at the discharge nozzle to minimize the amount of the last dispensed fuel which is retained in the dispenser.

Figure 1:
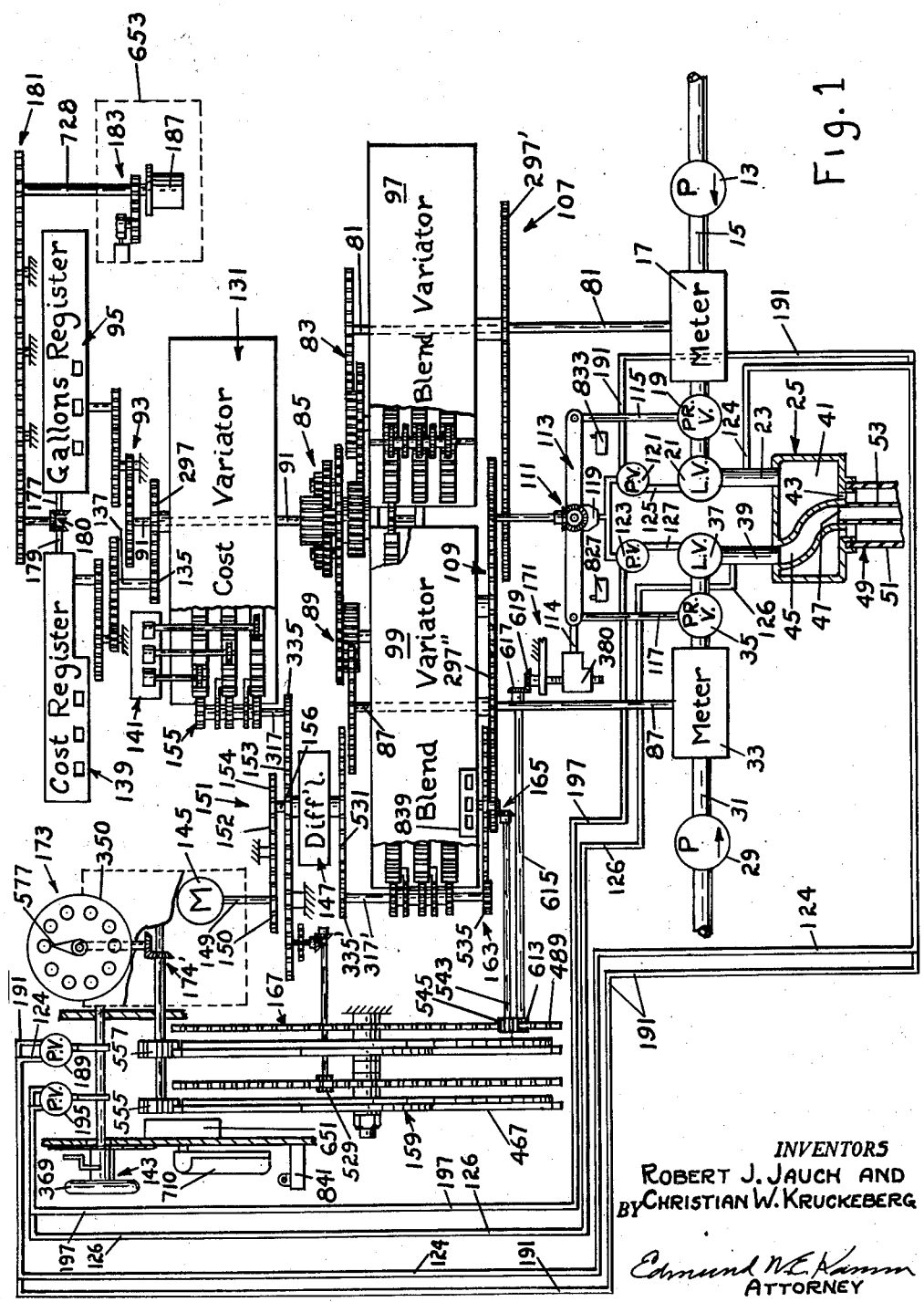
FIGURE 1 is a schematic drawing of a blender showing the functional relation of the various elements of the entire combination.

Referring to FIGURE 1 of the drawings, Lofuel is pumped from one tank by a pump 13 and discharged through a conduit 15, a meter or other prime mover 17, a proportioning valve 19, a limit valve 21 and a pipe 23 into an adaptor 25. Hifuel is pumped from another tank by a pump 29 and discharged through a conduit 31, a meter or other prime mover 33, a proportioning valve 35, a limit valve 37 and a pipe 39 into the adapter 25.

The adapter 25 is provided with a chamber 41 which is connected to receive the Lofuel from the pipe 23 and has an annularly shaped port 43 for discharging the Lofuel from the chamber.

A passageway 45 is connected o receive the Hifuel from the pipe 39 and discharge it through a port 47 positioned within the annular port 43.

Figure 2:
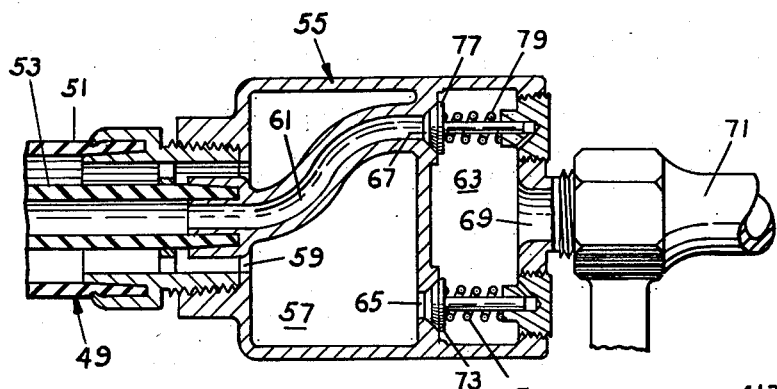
FIGURE 2 is a detailed view, with parts in section, of an adaptor for connecting a nozzle to a dual hose.

A dual hose 49, FIGURES 1 and 2, includes an outer hose 51 connected to the adapter 25 to receive the Lofuel passing through the annular port 43 and an inner hose 53 connected to the adapter to receive the Hifuel from the port 47.

The other end of the dual hose 49 is connected to a second adapter 55 (FIGURE 2) which includes an inlet chamber 57 connected by an annular port 59 to the outer hose 51, a passageway 61, connected to the inner hose 53, and a second chamber 63 having valved inlet ports 65 and 67 respectively in communication with the inlet chamber 57 and the passageway 61 and an outlet port 69 discharging into a valve controlled dispensing nozzle 71. A check valve 73 is biased by spring 75 to close port 65 and check valve 77 is biased by spring 79 to close port 67.

The chamber 63 is made as small as possible so as to minimize the amount of fuel retained from the preceding delivery.

Referring to FIGURES 1, 3 and 11, the Hifuel passes through the meter 17 causing shaft 81 and gearing 83 to rotate and supply a first input to the differential 85 and similarly the Lofuel passes through the meter 33 causing shaft 87 and gearing 89 to rotate and supply a second input to the differential 85. The sum of the inputs is transmitted through shaft 91 and gearing 93 (FIG. 1) to advance a gallons register 95. The shaft 91 also drives the cost variator 131 which, in effect, multiplies the gallons rotation of the shaft by the unit price of the fuel being dispensed and displays this product on a cost register 139.

The shafts 81 and 87 also drive the compound proportioning variators 97 and 99 respectively. The output shafts from the variators 97 and 99 are respectively connected by gearing 107 and 109 (FIGS. 1, 3 and 12) of identical ratios, to provide first and second inputs into a substracting differential mechanism 111, the output of which is, in turn, connected to operate a valve control lever 113. The lever is connected by rods 115 and 117 to operate the proportioning valves 19 and 35 respectively, so that as one opens, the other closes and vice versa. The lever 113 includes a cam 119 which normally holds both of a pair of pilot valves 121 and 123 open. These valves are connected to control the limit valves 21 and 37 respectively to stop the flow of both fuels if the preset proportion is not maintained.

The blend proportioning system is of a null balance type, that is the rate of flow through one meter (17) is multiplied by the percentage setting of the variator (97) which it drives, the rate of flow of the other meter (33) is multiplied by the percentage setting of its variator (99), the low percentage is set on the variator of the meter which is to have the highest flow rate, the high percentage is set on the variator of the meter which is to have the lowest flow rate and the outputs of the two variators are applied in a subtracting direction to a differential mechanism, the output of which is applied to the meter valves to adjust them in a direction to restore the system to balance, whenever any unbalanced condition exists.

As an example, it is assumed that a blend containing four parts Hifuel and one part Lofuel is desired, that the nozzle valve will be opened far enough to dispense a total of 10 g.p.m. and that the output shafts of the meters rotate at 4 r.p.g. In such case the variator 99 will be set to 20% while variator 97 is set to 80%. When the desired blend is being dispensed, meter 33 will deliver 8 g.p.m. and drive its variator at 32 r.p.m. while meter 17 will deliver 2 g.p.m. and drive its variator at 8 r.p.m. The output from variator 33 will be 32×20% or 6.4 r.p.m. while that from variator 97 will be 8×80% or 6.4 r.p.m. Accordingly, the output from a differential 111 will be zero. Should either meter speed up or slow down, there will be an output from the differential in a direction which will actuate lever 113 to adjust the valves to bring the variator output shafts back to equal speeds.

In order to minimize the automatic adjustment of the valves after delivery, an approximate presetting of the valves is accomplished during the setting of the percentages on the variators. The lever 113 is tilted by a mechanism 171 (FIGURES 1, 12 and 13), to be described, so as to position the valves 19 and 35 in the approximate positions which they would occupy to maintain the rate of flow through the respective meters in the desired proportions.

As stated above, the outputs from the two variators are supplied to the differential 111 in directions which will cause the output from one variator to be subtracted from that of the other. If the outputs from the variators are equal when delivery is started, there will be no output from differential 111 which will move lever 113 and the valves 19 and 35. However, if the outputs of the variators are not equal, there will be an output from the differential which will move the lever 113 in the direction necessary to throttle the valve of the meter which has the excessive output and to open the valve of the other meter. This adjustment continues until the variators have equal outputs, whereupon the output from differential 111 becomes zero and lever 113 occupies its null or balanced position. However, if some accident such as a failure of the supply of either fuel to the meters, there is a continuous output from the differential 111, the cam 119 will operate the pilot valves 121 and 123 to close the limit valves 21 and 37, thereby terminating the flow of both fuels.

Figure 13A:
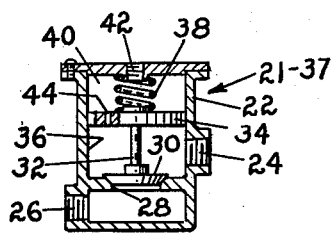
FIGURE 13A is a cross-sectional view of a limit valve which is controlled by the pilot valves of FIGURES 13 and 16.

The limit valves 21 and 37 are alike so that only one need be described. Referring to FIGURE 13A the valve comprises a body 22 having an inlet 24, an outlet 26, a valve seat 28 which is closed by a valve 30. The valve is mounted on a rod 32 which is connected to a piston 34 which reciprocates in a cylinder 36 located in the body above the seat. A spring 38 urges the valve closed and the piston and cylinder define a control chamber 40 which has an outlet 42. The piston is provided with a small orifice 44 which permits liquid to pass from the inlet to the chamber 40.

When the outlet 42 from chamber 40 is closed, pressures on opposite sides of the piston 34 will be balanced through the orifice 44 and the spring will hold the valve closed. However, when the outlet 42 is open to a pressure which is less than the pressure at inlet 24 (it usually opens to the outlet 26) liquid will escape from the cylinder more rapidly than it can enter it through the orifice. Consequently, the differential of the inlet pressure and that in the chamber 40 acting on piston 34 overcomes the spring 38 and the inlet pressure acting on valve 30 and the valve will open. When outlet 42 is again closed, the differential pressure acting on the piston is reduced to zero through the orifice so that the spring will close valve 30.

Pilot valves 189 and 195 are disposed for operation by the blend selector 143 so as to close the limit valve of either fuel when it is desired to dispense only the other fuel. To accomplish this result, pilot valves 189 and 121 are connected in series from the control chamber outlet of limit valve 21 through line 125, pilot valve 121, line 191, pilot valve 189 through line 124 to the limit valve outlet. Pilot valves 123 and 195 are similarly connected in series from the control chamber outlet of limit valve 37 through line 127, pilot valve 123, line 197, pilot valve 195 through line 126 to the outlet of limit valve 37.

Thus when either pilot valve in either circuit is closed the corresponding limit valve is closed and vice versa. The pilot valve 189 will of course be closed when the selector 143 is set to dispense only Hifuel and conversely, pilot valve 195 will be closed when the selector is set to dispense only Lofuel. Both pilot valves will be open for any other setting in order to permit delivery of a blend of the two fuels.

Figure 10:
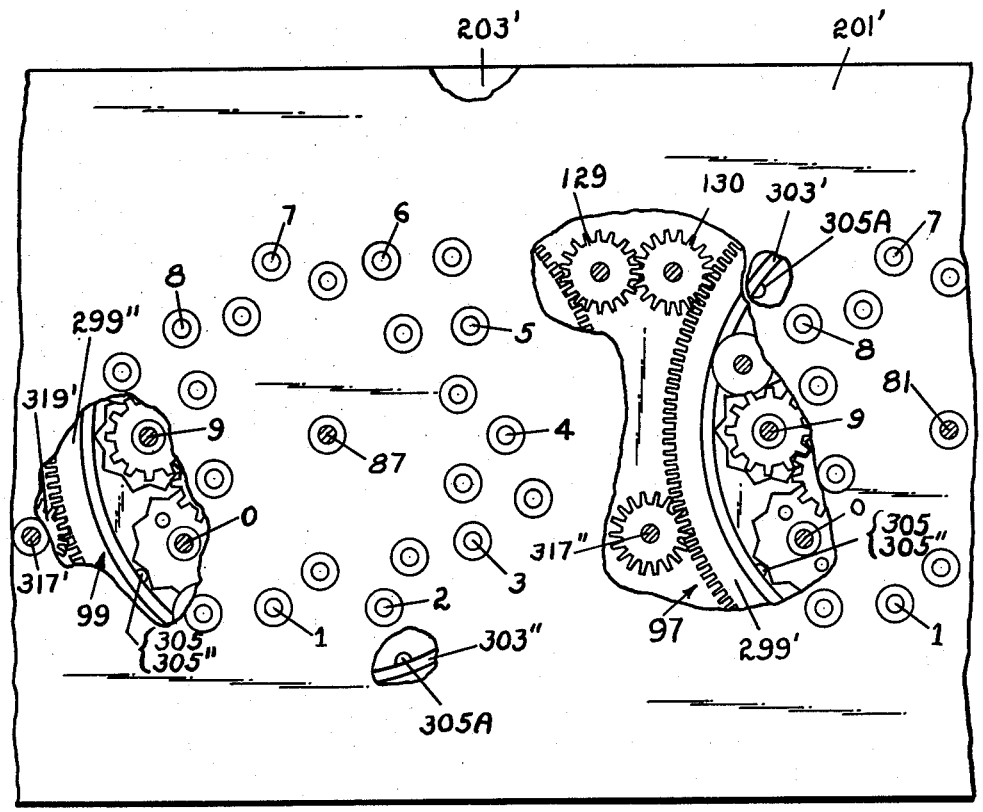
FIGURE 10 is a section taken on the line 10—10 of FIGURE 3 with parts of the plate broken away to show the ratio setting gearing of the blend variators.

A blend selector mechanism 143 (FIGS. 1, 14 and 20) includes manually rotatable stepping mechanism, which when displaced in either direction, starts a motor 145 revolving in a direction corresponding to the direction in which the blend selector mechanism 143 was rotated. The shaft 149 of motor 145 drives gear train 151 which is connected to drive the input of a differential 147 (FIGS. 1 and 11). One output gear 153 (FIG. 11) of the differential 147 drives the gear 335 of the transfer mechanism 155 of the cost variator 131 and also drives the gear train 157 (FIGS. 11 and 12) and pinion 529 which meshes with the large gear 467 of the price stop mechanism 159. A second output gear 531 of the differential 147 (FIG. 11) drives the percentage setting gear 335' and shaft 317 of the blend variator 99 which is connected to drive the corresponding percentage setting mechanism of the blend variator 97 by means of the idler gears 129, 130 (FIG. 10).

A gear train 163 (FIGS. 1 and 12) is driven by the gear 535' on the transfer shaft 317 of variator 99. This train drives shaft 543 and pinion 545 which meshes with the large gear 489 of the blend stop mechanism 167.

As will be described in detail below, the stop mechanisms 159, 167 actuate the stepping pinions 555, 557 and a follower mechanism 547 (FIGS. 14 and 20) to stop the motor 145 when the blend variators have been set to deliver the selected blend and the corresponding price has been set on the cost variator.

Figure 13B:
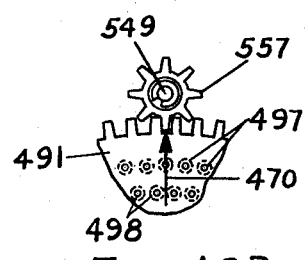
FIGURE 13B is a detailed view of the position indicator for the blend stop plate.
Figure 13:
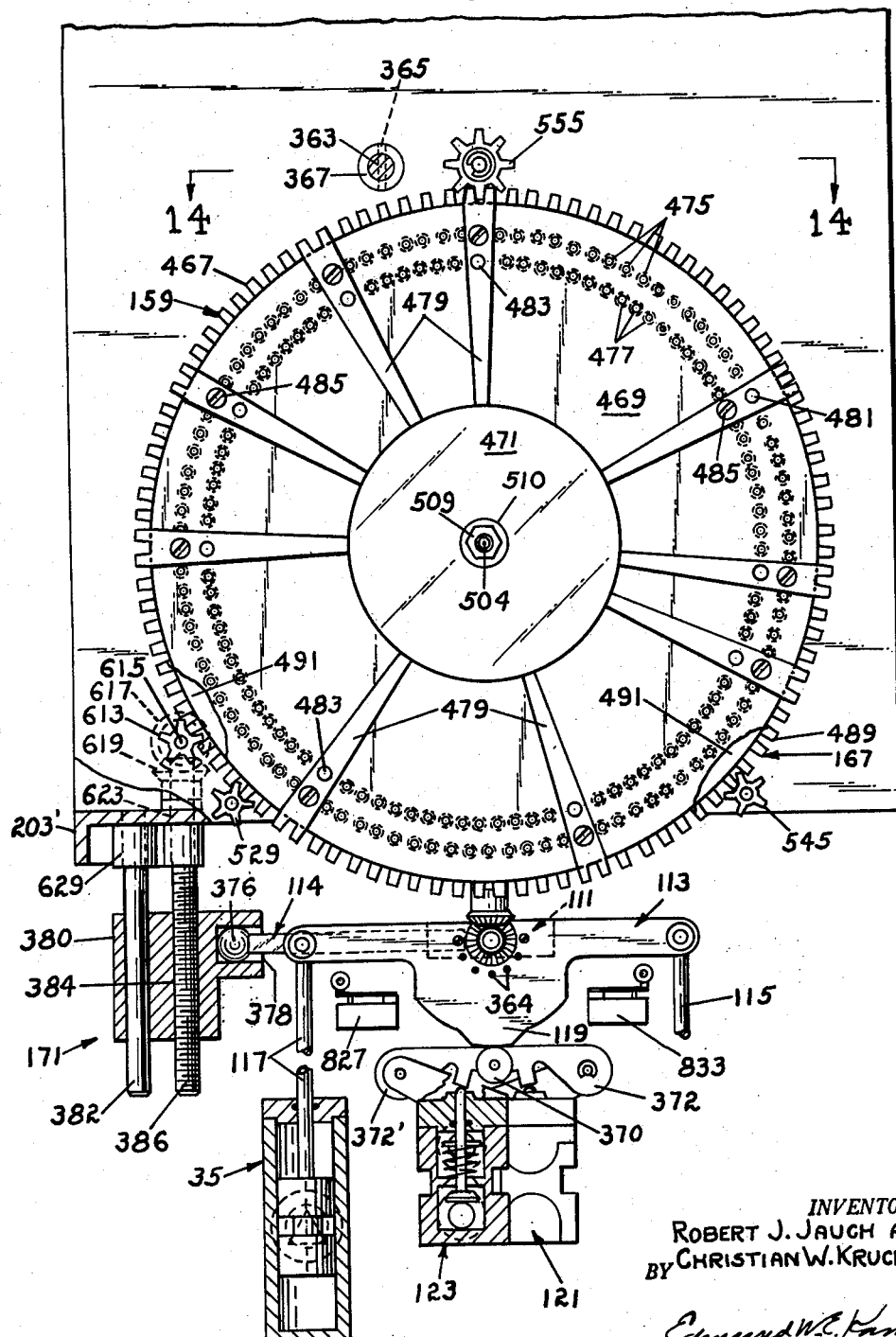
FIGURE 13 is a section taken on the line 13—13 of FIGURE 3 showing the blend and price stop mechanisms and the proportion limit control apparatus.

As seen from FIGS. 1 and 13, the blend stop gear 489 drives a pinion 613, shaft 615, miter gears 617, 619 and the positioning mechanism 171 which acts on a valve adjusting lever 115 (FIG. 12). The latter acts through the differential 111 to actuate the valve lever 113 to position the valves 19 and 35 in approximately the positions they should occupy to deliver the blend set up on the blend variators.

The blend indicator 173 (FIGURES 1 and 20) is also operated by the stepping pinions 555, 557 to indicate to the operator and the customer the number of the fuel which the blend variators have been set to deliver.

Further the follower mechanism includes means for causing the reset motor 187 to reset the cost and gallons registers 139, 95 to zero after the blend and price setting function is completed.

This function is accomplished by causing the motor 187 to drive a gear train 181 which drives the reset shafts 177, 179 of the register and also drives a mechanism 185 which, after two revolutions of the reset shafts 177, 179, reverses switch 743 (FIGURE 29) from the full line position to the dashed line position thereby interrupting the circuit to the reset motor 187 and completing a circuit to the motors of the dispensing pumps.

The entire cycle of operation described above is triggered by the closure of a switch 719 by means of a manually operated control lever 710 which is usually adjacent to the support 708 for the hose nozzle 71.

DIFFERENTIAL 85

Differential 85 is shown in detail in FIGURES 11 and 11A and consists of a gear 92 which is driven by gear 90 and also serves as the carrier for the planet gears 94, 96. Gears 96 are driven by a gear 98 integral with gear 100 which is driven by gear 84. Gears 92, 98 and 100 are rotatable on shaft 91. A second sun gear 102 is fixed to shaft 91 by a knurl 104.

Planetary gears 96 are twice the size of gear 98 and gear 102 is twice the size of gears 94. Thus when gear 100 is driven by the meter 17 through shaft 81, gears 83 and 84, the ratio to shaft 91 is ½ × ½ or ¼, so that for one gallon delivery through meter 17, the corresponding four revolutions of shaft 81 would result in only one revolution of shaft 91. Accordingly, the value of the gears 83, 84 and 100 must produce a 4 to 1 speed-up of sun gear 98 so that four revolutions of shaft 81 will result in four revolutions of shaft 91.

Similarly one revolution of gear 92 results in three-fourths of a revolution of sun gear 102 and shaft 91 and the gearing 89', 90, 92 must produce a 4 to 3 speed-up so that four revolutions of the meter shaft 87 will result in four revolutions of shaft 91. The directions of rotation of gears 92 and 100 must be such that the inputs add. Thus if meter 17 dispenses 1 gallon while meter 33 dispenses 1 gallon, as they would in the case of a 50% blend, the shaft 91 will rotate eight revolutions.

It is obvious that other values of gear ratios may be used to produce the necessary result which is that one gallon displacement by each meter must reflect a total rotation of shaft 91 equivalent to two gallons.

The gearing 93 connecting shaft 91 to the gallons register must of course be such that the total rotation of shaft 91 which is equivalent to one gallon will rotate the $\frac{1}{10}$ gallon wheel one full revolution so that the register will read 01.0 gallon.

COST VARIATOR

As stated above, the compound cost variator 131 is basically the same in construction and operation as the blend variators 97 and 99. For this reason only the cost variator will be described in detail and any differences in structure or function of the blend variators will be specifically pointed out.

It should be understood that one of the major features of all of these variators is that the setting of the ratios of the variators throughout the entire range of the variators speeds can be accomplished positively by a simple rotary motion. Further, the ratios are established by positive gearing which is continuously engaged so that there can be no error in the operation of the variators at any time. In addition, the ratio of the variators may be changed without having to move any of the parts thereof to a predetermined position prior to changing the ratio. These features are believed to be new in the art.

The compound cost variator 131 as shown in FIGURES 3 through 9 and particularly in FIGURE 4, comprises three separate variators or speed variating means which include a tenths speed change mechanism 101, a units speed change mechanism 103 and a tens speed change mechanism 105.

Upper and lower bearing plates 203 and 201 are held in spaced relation by suitable spacer rods (not shown) and by the frame 205 (FIGURE 3). The input shaft 91 for the cost variator 131 passes through both bearing plates and a spur gear 207 (FIGURES 4 and 5) is fastened to the input shaft at a point just inside the lower bearing plate 201. Ten spindles, respectively designated by the numerals 9, 8, 7, 6, 5, 4, 3, 2, 1 and 0, are journalled at opposite ends in the bearing plates and are spaced by intervals of 36° on a circle which is concentric with the axis of the input shaft. The spindles 9 through 1 are connected by spur gear trains, indicated generally by numeral 221, and with the drive gear 207. Spindle 0 is fixed and cannot rotate.

The gearing between the successive spindles is such that each time spindle 9 makes nine revolutions, spindle 8 will make eight, spindle 7 will make seven and so on. Thus the speeds of the respective spindles are always functions of numerical factors from 9 to 0 which is an arithmetic series or progression having an interval of unity.

It is of course necessary to properly relate the speeds of these spindles to whatever mechanism is driving the shaft 91, taking into account the particular spindle which is the first to be driven from the shaft, the units in which the driving mechanism movement is measured and the number of revolutions made by shaft 91 for each unit of movement of said mechanism.

To express these relations, let the expression $XR/U$ be the revolutions of shaft 91 for each unit of movement of the mechanism and let $n$ be the number of the spindle which is first driven from shaft 91. Then obviously, the gearing connecting shaft 91 to spindle $n$ must be $n/x$ so that the spindle speed will be $XR/U \times n/x$ of $NR/U$.

Figure 5:
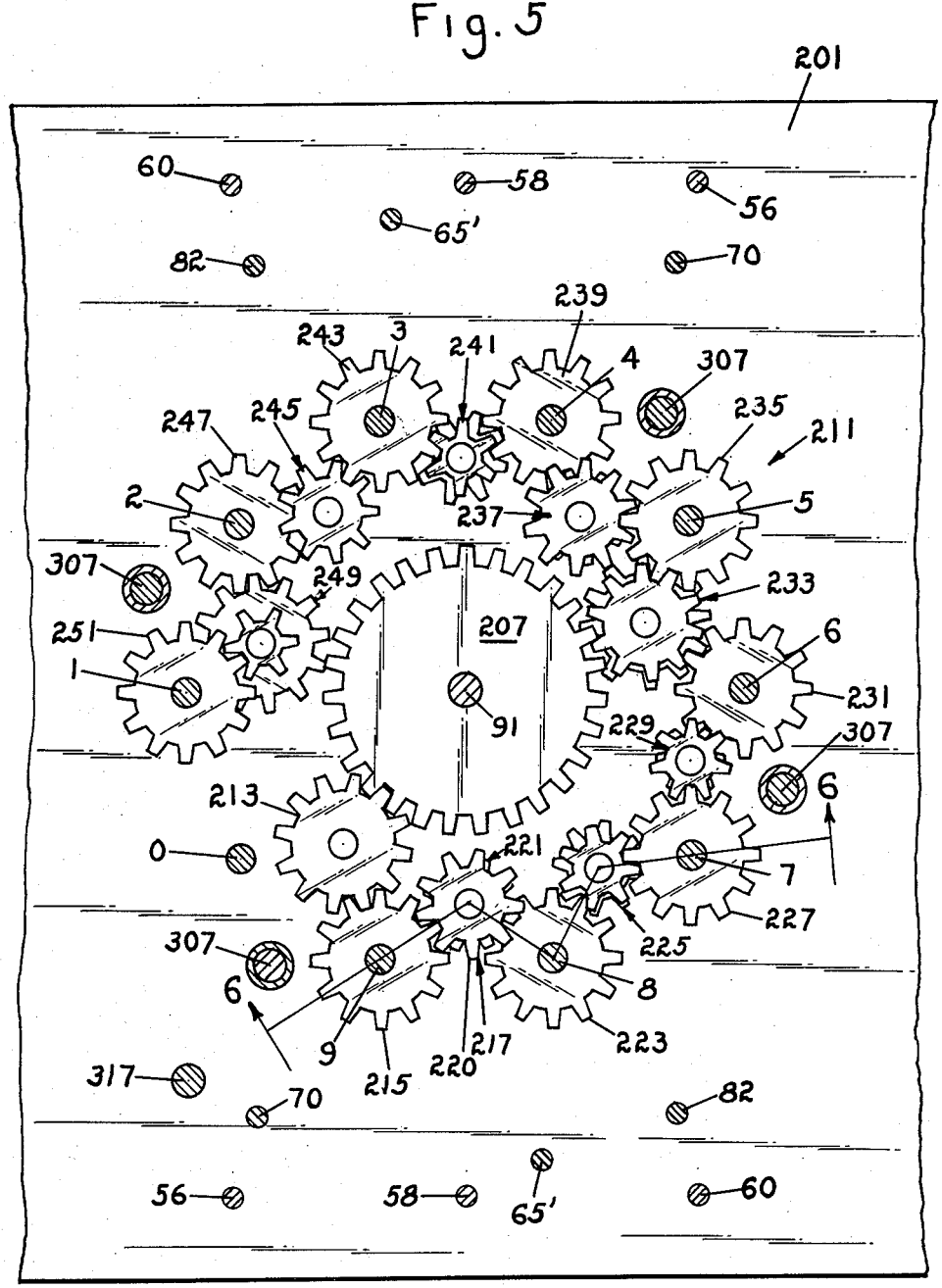
FIGURE 5 is a section taken on the line 5—5 of FIGURE 4 showing the gear train for driving the variator.

While the mechanism used to drive the spindle may be any device, the output of which can be reduced to a predetermined shaft rotation per unit, the mechanism of the preferred form is a liquid meter which produces four revolutions of shaft 91 for each gallon of liquid passing through the meter. Also the spindle numbered 9 is first driven from the shaft 91. According to the above principles gearing from shaft 91 to spindle 9 must be $4R/G \times 9/4$ to produce $9R/G$ at spindle 9. This requirement is satisfied by gears 207 of 27 teeth and 215 of 12 teeth. Gear 213 is an idler. As seen in FIGURES 5 and 6, gear 215 drives gear 220 (9 teeth) of a compound idler 217 and the small gear 221 thereof (8 teeth) is in mesh with an input gear 223 (12 teeth) fastened to the spindle 8 so that 9 r.p.g.'s (spindle 9) × 12/9 × 8/12 = 8 r.p.g. on spindle 8. The gear 223 drives a compound idler gear 225 which drives an input gear 227 fastened to spindle 7; gear 227 drives a compound idler gear 229 which drives an input gear 231 fastened to spindle 6; gear 231 drives compound idler gear 223 which drives an input gear 235 fastened to spindle 5; gear 235 drives a compound idler gear 237 which drives an input gear 239 fastened to spindle 4; gear 239 drives a compound idler gear 241 which drives an input gear 243 fastened to spindle 3; gear 243 drives a compound idler gear 245 which drives an input gear 247 fastened to spindle 2; and gear 247 drives a compound idler gear 249 which drives an input gear 251 fastened to spindle 1. The spindle 0 is not driven and is therefore stationary.

In each case the gearing connecting each spindle to the next adjacent spindles is such that the speed S of any spindle in revolutions per unit is expressed by the formula $$S = N\left(1 - \frac{n}{N}\right)$$

where N is the total number of spindles, $n$ is the number of the spindle as counted from the highest speed spindle (which is counted as 1) through the intermediate spindles to the spindle in question. Thus the speed of spindle 7 would be $10(1-3/10)$ or 7 and that of spindle 0 is $$10(1-10/10)$$

or zero.

Referring particularly to FIGURES 4, 6 and 7, each spindle 9 through carries three drive control mechanisms which are normally inactive or incapable of transmitting rotation from the spindle to the final output means of the compound variator. Each drive control mechanism is capable of being activated individually to transmit the rotation of the spindle exactly to the final output means in a modified form.

The disclosed compound variator comprises in effect three separate variators or speed variating means, each of which consist of one speed control mechanism of each spindle, a rotatable output member connected to be driven by each mechanism and a selecting means which is operatively associated with each drive control mechanism so that any one of the mechanisms can be activated thereby.

In order to secure the desired results in the mechanisms shown herein, the output from all of the mechanisms of each variator may be modified so that its effect at the final output means of the compound variator is different from that of the other two variators. Since the use to which the compound variator is to be put requires a decimal output, the output from the drive control mechanisms of the one variator is modified so that the rotation of the spindles which are 9, 8, 7, etc. revolutions per gallon are reflected at the final output as .09, .08, .07 etc., revolutions per gallon. The next variator has the outputs modified so that they become .9, .8, .7 r.p.g. while the output of the remaining variator is unchanged so that its effect at the final output is 9, 8, 7 etc.

It will thus be seen that the overall ratio of the compound variator again varies in accordance with an arithmetic progression of three digit numbers 0, .01, .02 . . . 9.98, 9.99 having an interval of 1/100, the first and last ratios being zero.

It is of course obvious that fewer or more spindles may be used and any number of individual variators may be compounded. Further the ratios need be chosen to provide the output of each variator or compound variator in accordance with the decimal number system.

The compounding of the output of the individual variators to provide the final output is effected by adding differentials.

In the preferred form disclosed herein, the drive control mechanisms are shown in the form of differential mechanisms having an input element driven by a spindle and two output elements, the first of which 267 drives the rotatable output member 275 and the other, which is the carrier 259, and is freely rotatable until it is stopped by the selecting means to be described. The stopping of the carrier activates the mechanism so that the spindle drives the first output and thereby the rotatable output member.

As stated above, each spindle 9 through zero carries a differential 253 for the tenths speed change mechanism 101, a differential 255 for the units speed change mechanism 103 and differential 257 for the tens speed change mechanism 105. The differentials 253, 255 and 257 are identical with the exception of the output gears which differ only in the number of teeth and which will be described below in conjunction with the input-output ratios of each speed change mechanism.

There are thirty differentials, all of which are alike. The ten differentials for the tenths mechanism 101 are designated by numeral 253; those for the units mechanism 103 by numeral 255 and those for the tens mechanism 105 by numeral 257. Each differential comprises a carrier 259 which has the form of a 20 tooth star wheel and which is freely journalled on its respective spindle 0 through 9. The number of star wheel teeth is not critical. The carriers for the tenths mechanism rest on the respective input gears for the corresponding spindles as shown in FIGURE 4, the carrier 259 of mechanism 101 for spindle 6 rests on the input gear 231 of spindle 6. Pinned to the spindle above the carrier is a sun gear 261 having 8 teeth. As shown in FIGURE 4, two integral planetary pinions each comprising a 12 tooth gear 263 and an 8 tooth gear 263' are mounted for rotation on posts 265 which are fixed in and project upwardly from the carrier. Gear 263 meshes with sun gear 261 while planetary gear 263' meshes with a 12 tooth sun gear 267 which is integral with an output gear 269. The unitary gear 267–269 is freely rotatable on the spindle. Thus when the carrier is locked and the spindle is rotated, the rotation of the spindle will be transmitted through sun gear 261 to planetary gear 263 and 263', to sun gear 267 and output gear 269.

Since the No. 6 spindle is shown in FIGURE 4 and since this spindle rotates at six revolutions per gallon, the revolutions of output gear 269 will be at the rate of $6 \times 8/12 \times 8/12$ or $6 \times 4/9 = 8/3$, r.p.g.

The output gears 269 of all of the tenths differentials 253 are in mesh with a gear 275 which is rotatably journalled on the shaft 91 and provide a speed reduction from 269 to 275 in the ratio of 25 to 3.

A small sun gear 277 (FIGURE 4) is integral with the gear 275 and provides one input into an additive differential indicated generally by 279. The sun gear 277 meshes with a pair of planetary pinions 281 which are rotatably carried on separate posts 283 attached to and depending from a gear 285 which meshes with all of the output gears 271 of the units differentials 255. The pinions 281 are each integral with a smaller planetary pinion 287 which is in mesh with a second sun gear 289 journalled freely upon the input shaft 91. The gear 285 is freely journalled upon the hub of the sun gear 289 which is integral with another sun gear 291 and which provides an input into a second differential 293. Differential 293 is similar to the differential 279 in that it includes a pair of integral pinions 281' and 287' and posts 283', and a sun gear 289'. The posts 287' are carried by and depend from a wide faced gear 295 which is journalled on the hub of the sun gear 289' and is in mesh with all of the output gears 273 from the tens differentials 257 (FIGS. 4 and 9). The hub of the sun gear 289' passes through a bearing in the upper plate 203 and a gear 297 is staked onto the end of the hub. Gear 297 meshes with a gear 135 fixed to the shaft 137 which is journaled in plate 203 and serves as the input shaft of the cost register 139.

Referring to FIGURES 4, 8 and 9, each variator or speed change mechanism 101, 103 and 105 is provided with a selecting means in the form of a ring gear respectively indicated by the numerals 299, 301 and 303. The ring gears are provided with a single inwardly projecting lug or tooth 305, 305' and 305" respectively (FIGURES 7 and 8). Four posts 307, which are equally spaced from each other and from shaft 91, project upwardly from the bottom plate 201, parallel to the spindles 0 through 9 and to shaft 91.

Each post 307 supports a stack of flanged rollers 309, 310 and 312 which are separated by spacers 311. The medial planes of the rollers and of the carriers 259 of the tenths differentials coincide, as does the medial plane of a radially inwardly extending flange 314 of the ring gear 299. The flange 314 is supported by the flanges of the rollers 309 so that the ring gear will rotate concentrically with respect to the shaft 91 and during such rotation, the tooth 305 which projects radially inwardly from flange 314 will be brought successively into locking engagement with the teeth of the associated carriers 259 to hold the engaged carrier against rotation.

The units ring gear 301 and its lug 305' are similarly supported relative to the carriers 259 of the units differential by means of rollers 310 and the tens ring gear and its lug 305" are similarly supported with respect to the tens differential carriers 259 by means of rollers 312.

Snap-on retainers 313 hold the rollers and spacers assembled on the posts.

As will be seen from FIGURE 4, the input to the differential 253 from shaft 6 is by way of sun gear 261 which is pinned to this shaft. As this gear rotates, it rotates the planetary pinions 263, 263'. Pinion 263' is in mesh with the sun gear 267. However since 267 resists rotation because of the load imposed upon it by the gear train which connects it to the register, the rotation of gear 261 will result in an idle rotation of the carrier which offers less resistance to rotation than does gear 267. Consequently, until the carrier is locked by the tooth 305 of the ring gear 299 there will be no output from sun gear 261 to sun gear 267 and the register will not be driven by the tenths differential of spindle 6. Conversely, when the carrier 259 of the tenths differential of shaft 6 is locked against rotation by tooth 305, there will be an output from this differential through sun gear 267 and output gear 269 which will be transmitted to the register.

The same is true for all of the differentials 253, 255 and 257. Since there is only one tooth on each of the ring gears, which can be positioned so as to hold the carrier of any of its associated differentials, it follows that the total output range of settings of the variator is from 000 to 999 in increments of 1, disregarding the positioning of the decimal point for the present.

In order to explain how the speeds of the output gears 269, 271 and 273 of the locked differentials 253, 255 and 257 are modified and combined to rotate gear 297, reference is had to FIGURE 4 wherein the ratio of gears 269 and 275 is 3/25; that of gears 277, 281 is 1/2; that of 287, 289 is 1/2; that of 291, 281' is 1/2, that of 287', 289' is 1/2 and that of gears 297, 135 is 3/1. Thus if we represent the revolutions per gallon of the spindle which is driving the locked tenths differential by A and remember that the ratio of the differential is 4/9, the revolutions/gallon of gear 135 and shaft 137 will be:

(1)   R.p.g. $137 = A \times 4/9 \times 3/25 \times 1/2 \times 1/2 \times 1/2 \times 3/1$
or $A \times 1/100$ Thus as A varies from 0 to 9 its effect on the output shaft will vary from .00 to .09 r.p.g. in increments of .01 r.p.g.

Referring to FIGURE 1, the rotation of shaft 137 is transmitted to a cost register which usually has three dials which display the cost in terms of dollars, dimes and cents. Thus one revolution of the cents dial represents 10 cents, 1/10 revolution equals 1¢ and 1/100 revolution equals 1/10¢. Thus the .01 r.p.g. output of the shaft 137 produces the 1/10¢ accumulation which is required on the cost register.

Tracing the effect of the output gear 271 of a locked units differential and representing the r.p.g. of the spindle which drives it by B, the ratio of gears 271, 285 is 2/5; the ratio of the differential 285, 281, 277, 287, 289 is 3/4; that of gears 291, 281' is 1/2; that of 287', 289' is 1/2 and that of 297, 135 is 3/1. Thus the revolutions/gallon of shaft 137 will be (2)   R.p.g. $137 = B \times 4/9 \times 2/5 \times 3/4 \times 1/2 \times 1/2 \times 3/1$
or $B \times 1/10$ Since, as indicated above, a 1/10 revolution of the cents wheel of the cost register equals 1¢, it will be seen that the output of a .1 r.p.g. of shaft 137 which results from the units mechanism produces the required 1¢ accumulation on the cost register.

Similarly, representing by C the r.p.g. of the spindle which is driving a locked differential of the tens mechanism, the ratio of gears 273, 295 is 1/1; the ratio of the differential 295, 281', 291, 287', 289' is 3/4 and the ratio of 297, 135 is 3/1. Thus the r.p.g. of shaft 137 as the result of a differential 257 is (3)    R.p.g. $137 = C \times 4/9 \times 1/1 \times 3/4 \times 3/1$ or $C \times 1$ Since one revolution of the first register wheel is the equivalent of one dime, it will be seen that a 1 r.p.g. rotation of shaft 137 which results from the tens mechanism will produce the required 10¢ accumulation on the cost register.

To conclude the explanation by a practical example, assume that 7 gallons of gasoline are delivered at a price of 32.9¢/gal.

The differential 253 of the tenths mechanism for the 9 spindle, the differential 255 of the units mechanism for the 2 spindle and the differential 257 of the tens mechanism for the 3 spindle will be locked by the respective ring gears 299, 301 and 303.

Differential 253 will produce $7 \times 9 \times 1/100$ or .63 revolution of shaft 137; differential 255 will produce $7 \times 2 \times 1/10$ or 1.40 revolutions of shaft 137 and differential 257 will produce $7 \times 3 \times 1$ or 21.00 revolutions of shaft 137. The sum of .63, 1.40 and 21 is 23.03 revolutions of shaft 137 since one revolution of the shaft produces one revolution of the cents wheel which is equal to one dime or 1/10 of a dollar, the 23.03 revolutions represents $2.303 which is the product of 7 gallons and 32.9¢/gallon. The register will of course display only the $2.30 and the final digit 3 is represented by a displacement of the cents wheel 3/100 of a revolution beyond its true zero position.

VARIATOR SETTING MECHANISM

As stated above, one of the main advantages of the variator just described is that none of the gears which connect the shaft 91 to drive the output shaft 137 are ever unmeshed. They are in continuous meshing engagement at all times and any one of the ten differentials 253, any one of the ten differentials 255 and any one of the ten differentials 257 can be rendered effective by simply stopping the carrier 259 thereof by rotating the lug of the corresponding ring gear into engagement therewith.

The ring gears are successively interconnected by a transfer mechanism so that when the tenths ring gear 299 is rotated one revolution in either direction between the positions in which it locks the differential of the 9 and zero shaft, it will index the units ring gear one step of 36 degrees. A similar rotation of the units ring gear will produce a similar step of the tens ring gear. Thus it is necessary merely to rotate the tenths ring gear, manually or by means of a motor, to set the variator to any one of its ratios.

Referring to FIGURE 4 and 7, it will be seen that the tenths ring gear 299 and the units ring gear 301 are provided with a gear segment 315 and 315' respectively, which is disposed adjacent the higher order ring gear 301, 303 respectively. A transfer shaft 317 is journalled in the bearing plates 201 and 203 and its axis is contained in a vertical, radial plane T which bisects the angle between radial planes which contain the axis of shaft 91 and the spindles 0 and 9 respectively as shown in FIG. 7. With the sectors disposed to be bisected by plane T as shown in FIG. 7, the corresponding lugs are also bisected by this plane. Referring particularly to FIGURE 4A, an indexing or setting gear 319 is fastened to the transfer shaft by a pin 321 and meshes with the tenths ring gear 299. A detent mechanism 298 comprising a disc 300 is pinned to transfer shaft 317 and is provided with an indentation 302. A transfer gear 323 (FIG. 4 and 4A) and an indexing gear 325 are joined by a hub 327 and are rotatable on the transfer shaft. The hub is provided with a bore 304 in which a spring 306 and a ball 308 are mounted. The ball enters the indentation and serves as a detent. Transfer gear 323 lies in the path of the segment 315 of the tenths ring gear 299 and indexing gear 325 meshes with the units ring gear 301. Another transfer gear 329 and indexing gear 331 are joined by a hub 333 and are also journalled on the transfer shaft and rest on a disc 300' which is pinned to shaft 317. Another detent mechanism is provided between the hub 333 and disc 300'. The transfer gear 329 lies in the path of the segment 315' attached to the units ring gear 301 and indexing gear 331 is in mesh with the tens ring gear 303.

The ring gears 299, 301 and 303 each have 180 teeth while the transfer segment 315, 315', have 19 teeth, the end teeth being shortened to facilitate the meshing of the segments with their respective transfer gears. The indexing gears 319, 325 and 331 and the transfer gears 323 and 329 have 18 teeth. The detent mechanisms 298 insure that the indexing and transfer gears make exactly one complete revolution for each passage of the corresponding transfer segment.

It will thus be seen when the locking tooth 305 (FIG. 7) is engaged in locking engagement with the carrier 259 of the differential 253 for the zero spindle, the partial tooth at the right end of segment 315 will be substantially in engagement with the tooth of gear 323 which is held in radial alignment with plane T by the detent 298. Thus if the ring gear 299 is rotated counterclockwise to move the locking lug into engagement with the carrier 259 of the spindle 1, the transfer gear will be rotated a full revolution when the partial tooth on the other end of the segment substantially loses contact with the radially directed tooth. Thus, in effect, the short teeth impart a ½ tooth advance of the transfer gear while each of the 17 full teeth impart a full tooth advance. Since the ring gear 301 has 180 teeth and the indexing gear 325 has 18 teeth, the ring gear will be rotated 1/10 of a revolution or 36 degrees each time the ring gear passes from locking position 0 spindle to locking position with that of the 9 spindle or vice versa.

A similar indexing of ring gear 303 by ring gear 301 occurs in a like manner.

The transfer shaft of the cost variator 131 extends through the lower bearing plate 201 and a gear 335 is fastened to its lower end by a pin 337 and is driven by the gear 153 through an idler gear 507 of FIGURE 11 which is described below.

Therefore as the gear 153 is rotated in either direction, the transfer shaft 317 is correspondingly rotated.

Summarizing the operation of the transfer mechanism just described, each revolution of gear 335 causes a revolution of the indexing gear 319; the tenths ring gear 299 will turn one-tenth of a revolution, thereby moving the lug 305 from locking position with one of the tenths differential carriers 259 to locking position with an adjacent tenths differential carrier 259. Assuming that the locking lug 305 initially locked the 0 spindle carriers, each ten revolutions of the transfer shaft 317 will rotate the tenths ring gear 299 one full revolution. Each time the lug 305 unlocks the differential carrier 259 on the 9 or 0 spindle and moves to a position in which it locks the carrier on the 0 or 9 spindle, the segment 315 attached to the tenths ring gear 299 will rotate the transfer and indexing gears 323 and 325 one revolution, thereby moving the lug 305' of the units ring gear 301 from locking position with one units differential 255 into locking position with an adjacent units differential 255. Similarly, once during each revolution of the units ring gear 301, the segment 315' attached thereto will rotate the transfer gear 329 and attached indexing gear 331 one revolution, to move the lug 305'' of tens ring gear 303 to unlock one tens differential 257 and to lock an adjacent tens differential 257. Again this transfer occurs as the lug 105′ unlocks the differential on the 9 spindle and moves to lock that on the 0 spindle or vice versa.

In other words, the ring gears and the transfer mechanisms operate just like a three wheel, decimal or decade counter, with the transfer from the lower order wheel to the next higher order occurring when the lower order wheel passes from 9 to 0 in an ascending count or when it passes from 0 to 9 in a descending count.

Therefore, the cost variator 131 is settable to any one of 1000 settings from and including prices ranging from 00.0 to 99.9¢ per gallon in increments of .1¢/gallon by merely rotating ring gear 299 in the proper direction the proper distance.

As will be seen from FIGURES 1, 3 and 9 particularly, the unit price register 141 comprises three dials 50, 52 and 54 which display, in terms of cents and tenth cents, the ratio at which the cost variator is set to compute the cost.

The dials 50 are each driven by a shaft 56, gear 62, idler 68 which is mounted on a rotary shaft 70 and which meshes with the ring gear 303 of the speed change mechanism 105. Dials 52 are each driven by a shaft 58, a gear 64, and idler 64′ which is mounted on a rotary shaft 65′ and which meshes with the ring gear 301 of mechanism 103. Dials 54 are each driven by a shaft 60, gear 66, rotary shaft 82 and a gear 80 which meshes directly with ring gear 299 of mechanism 101.

The dials are of course timed initially to the positions of the ring gears so that they will each display a zero when the ring gears lock the carriers 259 of the zero shaft and they will be stepped successively to display the numerals 1, 2 etc. as the ring gears which are driving them are stepped by the transfer mechanism 155 shown in FIGURE 4.

BLEND VARIATORS

Since the blends of motor fuels now generally used do not require proportions which vary in increments of one tenth of 1%, it is not necessary to use the full range of the variators just described which has a range of a thousand settings, although the full range variator could be used if desired.

In order to provide a blend variator which will have a range of one hundred percent in ½ percent increments, the tens differentials 257 and their output gears 273 (FIGS. 4 and 9), corresponding to the spindles 2 through 9 inclusive, are omitted from the variator described in detail above. The comparable differentials on spindles 0 and 1 are retained.

Thus, considering Equation 3 in column 11, the values of A and B each range from 0 to 9 but the value of C can be only 0 or 1. Therefore the range of speeds provided by the blend variators 97 and 99, at shaft 137 is from 0.00 to 1.99 in increments of .01 and there are thus 200 steps. The last step would normally be from 1.99 to 2.00 but in the latter position the output of the variator falls to zero because there is no tens differential on spindle 2. Each gear 303′ has a lug 305A to lock the zero starwheel at the end of said last step.

Relating the variator to the meter driving it and referring to the theory of the proportioner given in column 4, it will be seen that when the percentage setting on either variator V1 or V2 is zero, the setting on the other must also be zero otherwise there will be an output from the valve operating differential 111.

This requirement is met when nominal range settings of 0.00–2.00 or 2.00–0.00 are made on the two variators as described above and with these settings, only one or the other meters will be delivering fuel.

In order that there may be no question that the range expressed above as being 0.00 to 1.99 constitutes a percentage setting of a variator, it should be considered that the range or rate of flow of either meter varies from zero to a maximum which is a 100% rate of flow. This range is divided into 200 steps by the variator hence each step is equivalent to ½ of 1%.

In actually setting the blend variators 97 and 99, the rotation of the ring gear 299 of the tenths speed change mechanism 101 36 degrees to move the lug 305 from locking position with one differential carrier 259 into locking position with an adjacent one, in either direction, changes the output of shaft 137 by .5 of 1%. Rotation of the ring gear 301 of the units speed change mechanism 103 one tenth of a revolution changes the output by 5% and rotation of the ring gear 303 of the tens speed change mechanism 105, one tenth of a revolution, changes the setting by 50%.

As shown in FIGS. 1, 3 and 10, the blend variators 97, 99 are inverted from the FIGURE 4 position so that the tenths ring gears 299′ and 299″ are at the top of the variators. These ring gears are geared together by idler gears 129, 130 (FIG. 10) after having been first set to complementary range settings such as 50–50 and as the range setting of variator 97 increases or decreases, that of variator 99 will decrease or increase by exactly the same amount so that the range settings will maintain their complementary relationship, that is, the sum of the ratios is constant except at the zero and 100% settings.

As shown in FIG. 3, the transfer shaft 317′ of variator 99 extends through both bearing plates 201′, 203′ and its drive gear 335′ is disposed above plate 201′ so as to mesh with a gear 531 (FIGS. 1 and 11) of the differential 147. The transfer shaft 317″ has no gear corresponding to gear 335′ but is driven by its tenths ring gear 299″ through the idler gears 129, 130.

Transfer shaft 317′ of variator 99 has a gear 535′ fixed to its lower end below plate 203′ which drives a gear train 165 which drives the blend stop mechanism 167 as will be described in detail below.

PROPORTIONING VALVE DRIVE

The respecive output gears 297′ and 297″ from variators 99 and 97 must rotate at like speeds when the proportioning system is in balance, as described above. Accordingly the gear trains which connect these gears to their respective inputs to differential 111 must meet only the requirements that they have the same ratio and that the inputs must be in a subtracting direction. Thus as best seen in FIG. 12, the gear 297′ has 24 teeth and drives an idler 135′ which drives a 8 tooth gear 343. A miter gear 345′ which is integral with gear 343 is thus driven 4 revolutions for every 3 revolutions of gear 297′. The miter gears have a 1 to 1 ratio so that shaft 351′ and differential input gear 349 are also driven 3 revolutions. The final output gear 297″ of variator 97 is also a 24 tooth gear which meshes with a 8 tooth gear 343″ through an idler gear and through 1 to 1 ratio miter gears 345″ to drive the input shaft 351″ and differential input gear 349′.

Shafts 351′ and 351″ rotate in the same direction, when viewed from the same end, and the input sun gears 349, 349′ of differentials 353, 353′ also rotate in this direction. The inputs are therefore subtractive and there will be no output from the differential so long as the inputs are equal. The opposite sun gears 354, 354′ are fixed to shaft 355 which is coaxial with shafts 351′, 351″. The cages 356, 356′ rotate freely on shafts 351″, 355, and 355, 351′ respectively. Planetary gears 358, 358′ are rotatably mounted on the cages, in mesh with both sun gears of the respective differentials.

Valve control lever 113 (FIGS. 12 and 13) is centrally supported by a cylindrical hub 360 of cage 356 which is concentric with shaft 351″. The lever has a hole 362 in each end to receive the valve rods 115, 117. The holes 362 are equidistant from the center of shaft 351″ and the common centerline of the holes intersects the center of shaft 351″.

A limit cam 119 (FIGS. 3 and 13) is integral with the lever and projects radially and at right angles from the lever into the path of rollers 370, 370' mounted on the control arms 372, 372' of the pilot valves 121, 123. The dwell portion of the cam is long enough to permit the lever 113 to tilt far enough to fully open and close the proportioning valves 19 and 35. However, when the lever tilts beyond this point, the dwell portion will pass the rollers and allow the pilot valves to close and thereby to close the limit valves 21, 37 to stop the machine. The proportioning valves are preferably piston valves with triangular ports such as that shown in FIG. 13 or any other type which may be moved beyond the full open or full closed position. Although other types of valves or valve mechanisms which will permit overtravel of the lever may obviously be used.

A number of spaced holes 364 (FIG. 13) are formed in lever 113 in a semicircular pattern about its fulcrum center. Two tapped holes 366 (FIG. 12) are provided in the end of cage 356 on diametrically opposite sides of shaft 351" and at the same radius as holes 364. A screw 368 is inserted through a hole 364 and tightened in a hole 366 to cause lever 113 to rotate with the cage.

The screw normally occupies an end hole 364. Should the lever 113 tilt enough to cause cam 119 to close one of the pilot valves, due to unusual operation, the apparatus would stop with the pilot valves and the valve gearing locked so that the apparatus cannot be restarted. To restart it, screws 368 can be removed and the lever 113 can be manually rotated toward the position it should occupy and the screw is inserted in the hole 364 which is aligned with a hole 366 when the lever is in approximately its proper position. The cam opens the pilot valves as the lever is rotated so that operation may be resumed, assuming that the condition which caused shutdown has been corrected.

VALVE PREPOSITIONING MECHANISM

The prepositioning mechanism indicated generally by 171 comprises a second lever 114 which is fixed to the end of cage 356' by screws 374 (FIGS. 12 and 13). The free end of the lever is formed as a sphere 376 which rides in a bore 378 formed in a prepositioning head 380 which is preferably coaxial with the lever when the latter is horizontal. The head is slidably mounted on a vertical guide pin 382 which is fixed to and depends from a support 629 on the plate 203'.

The head is provided with a tapped hole 384 which is parallel to the pin 382 and a lead screw 386 which is parallel to the pin 382 and a lead screw 386 which is rotatably mounted in the tapped hole 384 and in a bearing 623, also on the plate 203'. The screw is driven by the miter gear 619 which is pinned to it and which is driven by miter gear 617, shaft 615 and gear 613. The latter meshes with the blend stop gear 489 (FIGS. 11 and 13).

OPERATION OF PROPORTIONING VALVE MECHANISM

It will be seen from the above description and from FIGURE 12 that when the variators 97, 99 are driven by the meters, the sun gears 349 and 349' will be turning in the same direction and, if the meters are delivering at the proper rates to maintain the percentages set on the variators, these sun gears will be running at the same speeds because the gear trains 107 and 109 have the same ratio.

Since gears 349, 349' are running in the same speeds, the sun gears 354, 354' will be running in the same direction at the same speed but the direction will be opposite to that of gears 349, 349'. The differential carrier 356' is held against movement by the prepositioning mechanism and, under the conditions described, cage 356 will be motionless as will the valve lever 113 and the proportioning valves.

Should the Lofuel meter slow down, the sun gear 349, 354 and 354' will slow. Sun gear 349' will now be rotating faster than 354' and this will result in a clockwise rotation of cage 356 and lever 113, viewed from the left of FIGURE 12. The proportioning valves 35 for the Hifuel meter will accordingly be throttled while valve 19 for the Lofuel meter will be opened wider.

The same result is attained in the same manner if the Hifuel meter runs too fast.

Conversely, if the Lofuel meter should run too fast, the sun gear 354' will rotate faster than gear 349'. This will result in a counterclockwise rotation of cage 356 and lever 113 which will cause the proportioning valve of the Hifuel meter to open further and that of the Lofuel meter to throttle.

The same result is attained in the same manner should the Hifuel meter run too slow.

Thus in each case the adjustment is in the direction required to establish the required proportion and will cease when the proportion is attained.

If for any reason, the adjustment of the valves does not produce the required increase and decrease of the respective meter speeds, the mechanism will continue to adjust the valves up to the point that the cam 119 clears the rollers of the pilot valves 121, 123 so that they will close. This action results in the closure of the limit valves 21, 37 as described on page 8 above and flow through both meters is halted. After such stoppage of the apparatus and after the correction of the defect which caused it, the valve lever can be manually set to the valve open position by removing screw 368 and rotating the lever 113 as described above.

OPERATION OF PREPOSITIONING MECHANISM

The function of this mechanism is to position the valve lever 113 and the proportioning valves in positions approximating those which they should occupy to deliver the proper percentage of each of the constituents of the blend.

This mechanism is operated when the ratios of the blend variators are set and no fuel is being delivered. Accordingly, the sun gears 349 and 349' of differential 111 (FIG. 12) will be stationary. If the lever 114 is moved counterclockwise when viewed from the left, the cage 356' will be similarly rotated. This produces a counterclockwise rotation of sun gears 354', 354 and a corresponding counterclockwise rotation of cage 356 and valve lever 113 which will open the Hifuel valve and throttle the Lofuel valve.

Rotation of lever 114 in a clockwise direction produces a clockwise rotation of the valve lever to throttle the Hifuel valve and open the Lofuel valve.

Thus, as the ratio setting of the blend variator 99 increases, reflecting the delivery of a smaller flow of the Hifuel constituent, lever 113 must be rotated clockwise (FIG. 13) to reduce the opening in valve 35 and increase that of valve 19.

Such rotation of lever 113 is produced as follows: As seen in FIGURE 10 the ring gear 299" of variator 99 must be rotated counterclockwise to increase its ratio setting. This is accomplished by a clockwise rotation of transfer gear 319' and shaft 317'.

Referring to gear train 165 in FIGS. 1 and 12 it will be seen that gear 535' also rotates clockwise to drive gears 537, 539 counterclockwise which in turn drive gear 541, shaft 543 and gear 545 clockwise as viewed in FIG. 13. Since gear 489 serves as an idler between gears 545 and 613, the latter as well as shaft 615 and miter gear 617 (FIG. 13) are rotated clockwise and produce a clockwise rotation of miter gear 619 and screw 386 as viewed from the top in FIG. 13. Since the screw has a right hand thread, the head 380 will move upward to rotate lever 114 clockwise. As pointed out above, lever 113 will also rotate clockwise to throttle the Hifuel valve and open further the Lofuel valve, which was the result to be accomplished.

The ratio of the gear train just described and the pitch of the screw threads are preferably proportioned so that the valve 35 is fully closed when the variator 99 reaches its maximum setting and vice versa: The valve 19 for the Lofuel meter must of course be moved fully open when valve 93 is fully closed and vice versa.

BLEND SELECTOR MECHANISM

The blend selector mechanism 143 is shown generally in FIGURES 1 and 3 and in detail in FIGURES 14 through 19.

A circular dial 357 (FIG. 15) mounted on the exterior of a housing 359 is arbitrarily marked at 36° intervals with the numbers assigned to the individual fuels which can be dispensed. The lowest number 1 indicates the Lofuel, the highest number 10 indicates the Hifuel and each intermediate number indicates a blend of the two. The percentage of the Hifuel used in the blends increases with the value of the numbers. The dial 357 is provided with a fixed stop 361 positioned between the highest and the lowest number which cooperates with the pointer 371 to prevent it from moving directly from 1 to 10 or from 10 to 1.

A shaft 363 extends centrally through the dial 357, and a bearing in the frame 205 and, at the inner end, is provided with a pin 365 which engages a coupling 367. A knob 369, provided with the pointer 371, is fastened to the end of the shaft 363 outside the housing 359.

A detent device 373 (FIG. 16) is provided to properly position the pointer 371 relative to the blend numbers. This device includes a ten tooth star wheel 375 fastened to the shaft 363, a roller 377 mounted on a crank arm 378' which is pivoted on the frame at 379 and a helical spring 381 which has one end hooked around the shaft 363 has its other end hooked on crank pin. A blend locking device 383 is provided to prevent further rotation of the knob 369 once a delivery has been started. This device includes a ten tooth locking disc 385 fastened to the shaft 363, a pawl 387 pivoted on the frame member 205 (FIG. 14) at 389 and a link 391, which is operable by a solenoid 392 to pivot the pawl into engagement with the teeth on the ratchet when a delivery is started and a spring 390 pivots the pawl out of engagement when a delivery is stopped, as will be described.

Referring particularly to FIGURES 14, 16 and 17, cams 193 and 199 are fastened to the shaft 363, and are respectively provided with a single peripheral notch 395' and 395. The pilot valve 189, previously described, is provided with a lever 397 on one arm of which is mounted a roller 399 which rides upon the periphery of cam 193 and the other arm of which actuates the valve stem 400. Pilot valve 195 is similarly equipped with a lever 401 carrying a roller 403 which rides upon the periphery of the cam 199. The cams are so disposed with respect to the pointer 371 that when it properly indicates fuel number 1, as shown in FIGURE 15, the roller 403 is in the notch 395 of cam 199 and the roller 399 is on the periphery of the cam 193. The pilot valve 195 is therefore closed and limit valve 37 will also be closed as described above so that no Hifuel can be delivered. In this position of the cams, pilot valve 189 will remain open. When the pointer is set at any number 2 through 9, rollers 399 and 403 will be on the periphery of the respective cams so that both pilot valves will be open. When the pointer is set at number 10, the roller 403 will be on the periphery of the cam 199 while roller 399 is in the notch 393, so that pilot valve 189 is closed and only Hifuel can be dispensed because limit valve 21 is closed.

The coupling 367 is fastened to one end of a shaft 405 which enters an explosion proof box 407 provided with bearings 409 (FIGURES 14 and 19) for the shaft. A rotary follower mechanism 411 is provided for causing the blend and price setting mechanism to operate in the direction required to set the blend and price to that corresponding with the number of the fuel selected by the rotation of the knob as just described.

As indicated previously, the motor 145 drives the blend and the price setting mechanisms 167, 159 of the variators 97, 99 and 131. Obviously, if the pointer was previously set to an intermediate number such as 6, for the prior delivery and the pointer is set to a higher number such as 8, the motor will have to rotate in the direction which will increase the price and the percentage of Hifuel to be delivered. This means that the setting of variators 97 and 131 will be increased while that of 99 is decreased. Conversely, if the pointer is moved to indicate a lower number, the motor will have to rotate in the opposite direction to decrease the settings of variators 97 and 131 and to increase that of 99. If the blend setting is not changed there will be no operation of said mechanisms.

PRICE-BLEND SETTING MOTOR CONTROLS

Referring particularly to FIGURES 14, 18, 19 and 20, the direction of movement of the price-blend setting motor is determined by a control apparatus 413 (FIGS. 14, 18, 19 and 20) which comprises a circular clutch member 417 (see FIG. 19 esp.) fastened to the shaft 405 by a pin 419 and having a long hub 421. A friction material 423 is attached to the inner face of 417 and engages the adjacent face of a circular plate cam 425 which is journalled freely upon the hub 421. The periphery of the cam 425 (FIG. 18) is provided with a shallow recess 427 and a deeper recess 429 which are connected by a rise portion 428. The roller 431 of a single-pole, double-throw switch 433 is arranged so as to follow the profile of the cam rise in passing from one recess to the other. Contacts 433A (FIG. 29) are closed when the roller is in the recess 429 while contacts 433B are closed when the roller is in notch 427. A second circular clutch member 435 (FIG. 19) is journalled upon the hub 421 of the first clutch member and is provided with a friction material 437 in contact with the adjacent face of the cam 425. A leaf spring 439 is mounted on the hub 421 and is held in pressure engagement with clutch member 435 by means of a retainer 441 so as to cause the clutch parts to frictionally drive the cam 425. Therefore, as the blend selector knob 369 is rotated in a clockwise direction (FIG. 15), the cam 425 will be similarly rotated (FIG. 18) and the roller 431 of the switch 433 will come to rest in the deeper recess 429 to close one set of contacts (FIG. 29) and cause motor 145 to rotate in one direction. When the knob is rotated in a counterclockwie direction, the roller will come to rest in the shallow recess 427, to close the other set of switch contacts and cause motor 145 to rotate in the other direction, as will be described more fully in conjunction with the control circuit diagram, FIGURE 29. A fixed stop 430 (FIGURE 18) enters an elongated notch 432 formed in the cam 425 to limit the rotation thereof to the distance required to position one or the other of the recesses 427, 429 adjacent roller 431. The shaft 405 can, of course, be rotated a much greater angular distance than cam 425 and in such case the clutch members merely slip on the cam. The rotation of the pointer 371 from one number to the next on dial 357 is sufficient to shift the cam from one of its positions to the other.

PREDETERMINED STOP MECHANISMS

As stated above, the variators described herein have the feature that they can be set to any one of a number of ratios by merely turning a shaft. This feature makes possible the motorized operation of the ratio selecting means. Another feature of invention resides in the combination with one or more of such variators, of predetermined stop mechanisms for stopping the ratio selecting means when the variator or variators have been adjusted to a preselected ratio or ratios.

In the preferred form disclosed, there is provided a cost variator 131 which has its ratio selecting means 317, 319, 323, 325, 299, 301, 303 etc. (FIG. 4) driven by the motor 145 (FIG. 1). The price determining means comprising gear 467 (FIG. 20) price stop plate 469 and price segments 479 which are driven in synchronism with the ratio selecting means of the variator. As shown in FIGURE 13, the sectors 479 are in effect separate predeterminers which are individually presettable with respect to the rotary stop plate to represent any one of a number of different preselected ratios of the cost variator. These predeterminers are normally ineffective since the motor is normally inoperative. Even when the motor is operating, only one of the segments is rendered effective to stop the motor. A particular segment is rendered effective by the manually settable knob 369 (FIG. 14) shaft 409 and the notched disc 443. These means are selectively operable to displace the notch 451 of the disc angularly one or more steps away from the lug or projection 457 of disc 433, thereby rendering a particular one of the segments effective to finally bring the lug or projection into alignment with the notch and to thereby open the switch 465 for the motor. The segments drive the lug in a "count down" direction by means of the gearing 555, 565 and 453 (FIG. 14) and while all of the segments which pass the gear 555 effect a rotation thereof and of the lug, nevertheless it is not until the segment, which has been rendered effective by the selectively operable means, imparts its rotation to the gear 555, that the motor is stopped.

It will be seen that a similar predetermined stop mechanism is provided for the blend variator 99 and that for convenience in providing a blender, the ratio selecting means of the blend and price variators are driven from separate outputs of a differential which is driven by the motor. Also for convenience, the predeterminers of the two sets of predetermining means act in unison to rotate the gear 453 of the count down portion of the predetermined stop mechanism. However it is obvious that there is a separate set, consisting of a number of normally ineffective predetermining means, for each of the variators. It is thus seen that the basic novel combination comprises a variator which is settable to different ratios by rotation of a shaft, a mechanism for stopping the shaft when the variator is set to a selected one of a number of predetermined ratios.

Reverting now to the detailed description of the predetermined stop mechanisms, it will be seen that shaft 405 also carries an annular disc 443, which has a central axially projecting hub 445, FIG. 14, which hub is provided with a pair of diametrically opposed and longitudinally extending slots 446. The hub of the disc 443 is slidably mounted on the shaft 405 and is driven by a pin 449, fixed in the shaft and extending through the shaft and the slots 447. The face of the disc 443 which is opposite the hub, has a radially extending, V-shaped notch 451 (FIGS. 14 and 19). A 20-tooth gear 453 is rotatably journalled on a reduced diameter 455 (FIGURE 19) of the hub 421, is in face-to-face contact with the disc 443 and is provided with a radially extending V-shaped projection 457 which is received by the notch 451 when they are in radial alignment. A helical spring 459 encircles the shaft 405 and is compressed between the end of a boss 461 and the hub 445 to urge the disc 443 in contact with the gear 453. This gear is normally held against rotation by a pinion 561 of the blend and price stop mechanisms which are described below. The operating roller 463 of a single-pole, double-throw switch 465 (FIG. 14) rides on the exposed face of the disc 443.

As the blend selector knob 369 is rotated in one or the other of its directions, through one or more steps of its detent mechanism 373, the disc 443 will be rotated a like number of steps relative to the gear 453 which is held by the blend and price setting predetermining or stop mechanisms. The notch 451 on the disc 443 will thus be displaced from the projection 457 on gear 453 by the same number of steps to render the corresponding one of the predetermining means effective. Switch 465 is a single-pole, double-throw switch which is moved to close contacts 465A (FIG. 29) when the disc 443 is shifted axially away from gear 453 by the displacement of the projection relative to the notch and conditions the motor 145 to start. Switch contacts 465B are closed when the projection is seated in the notch. The switch is held closed until the gear 453 is rotated by the stop and follower mechanisms far enough to realign the projection with the notch, whereupon the spring 459 moves disc 443 toward the gear and the switch opens, to stop the motor.

Figure 18:
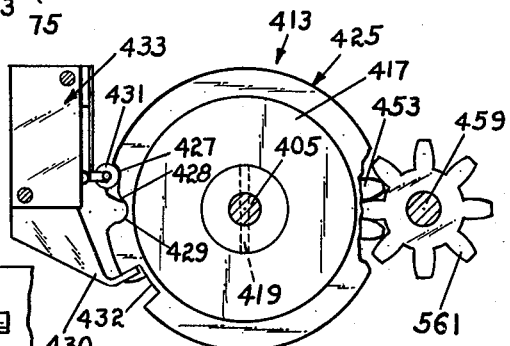
FIGURE 18 is a section taken on the line 18—18 of FIGURE 14 showing the apparatus for initiating rotation of the price and blend setting mechanisms in a direction corresponding to the rotation of the selector knob.

The blend and price predetermining means or stop mechanisms 167, 159 are driven by the motor 145 in the direction established by the control apparatus 413 of FIG. 18. These mechanisms are shown in FIGS. 1, 3, 11 to 14, 20 and 21.

Referring to FIG. 20, the price predetermining means 159 includes a 100 tooth gear 467 fixed on one end of a hub 473. A circular stop plate 469 and a smaller disc 471 are fixed on the other end of the hub. The hub rotates freely on a stud 504 fixed to frame 205.

Price stop plate 469 is provided with two circular, concentric rows of one hundred, radially spaced, tapped holes 475, 477 (FIGS. 13 and 20). The angular spacing between the holes of each row is the same or 3.6 degrees. The holes of the inner row are arranged equiangularly between those of the outer row so that the spacing between a hole of one row to the adjacent one of the other row is 1.8 degrees.

A number of two tooth gear segments 479, each of which constitutes a predeterminer, are provided, each of which has two through holes 481, 483 which are adapted to align with a hole 475 or a hole 477 in the outer or inner row respectively, when the butt or inner end of the segment is radially butted radially against disc 471. A screw 485 enters the aligned pair of holes to clamp the segment to the stop plate and the disc 471 coacts with the abutting end of the segment to hold it against pivoting about the screw. The teeth of the segment project beyond the peripheral edge of the stop plate so that as they are rotated past pinion 555, they will mesh therewith.

Thus it will be seen that a predeterminer segment 479 can be attached in any one of 200, equally spaced, radial positions on the stop plate. The machine is designed so that one complete revolution of the price stop plate corresponds to a change of 20¢ of the cost variator 131. Accordingly, dividing 20¢ by 200, the smallest increment of adjustment afforded by moving a segment by one hole (1.8 degrees) is 1/10¢. This is the smallest increment which can be set on the cost variator.

However, the width of the segments is such that the screws of two adjacent segments cannot be set closer than five holes apart (counting in both rows) so that the minimum interval between segments is five times 1/10¢ or ½¢. This is acceptable because the spread between the price of the various blends exceeds ½¢ in commercial practice.

The blend predetermining means 167 is identical with the mechanism just described and comprises a 100 tooth gear 489 (FIGS. 1, 14 and 20), stop plate 491, disc 493, hub 495, outer and inner circles of tapped holes 497, 498 (FIGURE 20), gear segments or predeterminers 499 having through holes 500, 501 and screws 503. The teeth of these segments are adapted to mesh with the pinion 557.

The hubs 473, 495 rotate on the stud 504, are spaced by washer 506 and are retained on the stud by a nut and washer 509, 510. As previously explained, the blend predetermining means or blend mechanism must be able, in one full revolution of gear 489, to select any available blend which ranges from a ratio setting on the blend variators 97, 99 of 0%–100% to 100%–0%. This is a range of 100% and since the stop plate contains 200 equally spaced holes in the two rows, the spacing between two adjacent holes (counting in both rows) is 100% divided by 200 or ½%. Again, since the segments cannot be set less than five holes apart, the minimum spread between adjacent blends is 2½%. This too is acceptable in commercial practice.

As disclosed in the general description above and by FIGS. 1 and 11, the reversible motor 145 drives shaft 149, gears 150, 152 and 154 of train 151, shaft 156 (FIGURE 1) and the planetary gear carrier 158 of the differential 147 (FIG. 11). The planetary gears 160, 160', in turn, drive the sun gears 162, 164 and the output gears 153 and 531 which are fixed respectively to the sun gears 164 and 162. As shown in FIGURES 1, 3, 11 and 12, the output gear 153 of the differential 147 (FIG. 11) drives through idler gear 507 to the gear 335 which is fixed to the transfer shaft 317 of the cost variator 131 (FIGURE 4). Gear 153 also drives the gear train 157 which comprises gears 511, 513 and 515, a vertical shaft 517 (FIGS. 11 and 12) and gears 519, 521, (FIG. 12) shaft 522, bevel gears 523 and 525, shaft 527 and a spur gear 529 which drives the 100 tooth gear 467 of the price stop plate. The gear ratios are such that for each .1¢ (36 degree) rotation of the tenths ring gear 299 of this cost variator, the stop plate 469 of price setting mechanism 159 is rotated 1.8° which is the equivalent of .1¢.

As the carrier 158 is driven clockwise by the motor (FIG. 11) gear 153 will run counterclockwise to rotate the variator in a direction to decrease the price setting of the blend variator and to decrease the blend price which is set by the price stop plate 469.

The second output gear 531 of the differential 147 (FIG. 11) is driven clockwise and drives gear 335' (FIG. 1 and 11) and the transfer shaft 317' of the blend variator 99 and the gear train 165 (FIGS. 1 and 12), starting with gear 535 which is fixed to the lower end of transfer shaft 317' and which drives gear 537 (FIG. 12), bevel gears 539 and 541, shaft 543, pinion 545 and the 100 tooth gear 489 of the blend stop mechanism 167. Still assuming that the carrier 158 is rotated clockwise, the clockwise rotation of gear 531 results in a decrease in the percentage of Hifuel used in the blend and in a rotation of the blend stop plate 491 in the same direction as the price stop gear.

For each ½% change in the blend, the tenths ring gears 299 of the blend variators 99 and 97 are rotated 36 degrees. The ratio of the gear train 165 is such that the rotation of shaft 317' which accomplishes such rotation of the ring gears also rotates the blend stop gear 489 and its blend stop plate 491 through 1.8 degrees which is the equivalent of ½%.

The gear sectors 479, 499 (FIG. 20) of the blend and price stop plates are disposed so as to drive the pinions 555, 557 which are both fixed to the shaft 549 which drives the pinion 561 of the follower mechanism 411 which will now be further described.

FOLLOWER MECHANISM

The follower mechanism or count down portion of the predetermined stop mechanism is shown in FIGS. 1, 14 and 20. The box 407 has aligned bearing bosses 551, 553 (FIG. 14) in which the shaft 549 is rotatably supported. One end of the shaft extends out of the box and the pinions 555, 557, which have eight teeth each, are pinned to this shaft with their teeth in exact axial alignment. The pinion 561 is fixed to shaft 549, within the box and meshes with the gear 453.

A detent mechanism 587 (FIG. 21) comprises a detent disc 581 which has eight equally spaced, arcuate peripheral notches 583 (FIG. 21) and is pinned to shaft 549. A pawl lever 589 is pivotally mounted intermediate its ends on a stud 591 which extends inwardly from one wall of box 407. One arm of 589 carries a roller 593 which is adapted to enter the notches 583 of disc 581. The arm is so positioned relative to the disc 581 that when its roller fully engages a notch 583, one tooth of each pinion 555, 557 will be held parallel to the line joining the centers of shaft 549 and stud 504 (FIG. 13). In other words, the teeth of pinions 555, 557 are positioned so as to be engaged by the leading tooth of the next gear segment 479, 499 respectively which approaches from either direction.

An adjusting screw 601 has a threaded portion 603 screwed into a tapped hole 599 in a lug 597 of box 407. The screw has an extension 604 of less diameter than 603, which projects through a hole 605 in arm 588 of lever 589. A helical compression spring 609 is confined between arm 588 and a washer 607 on the screw. A jam nut 611 on 603 coacts with lug 597 to hold the screw in any adjusted position to regulate the force with which roller 593 is held in a notch 583.

As shown in FIGS. 14 and 20, shaft 549 also carries a bevel gear 563 which meshes with gear 567 fixed to a shaft 569 which is journalled in and extends through the cover 571 of box 407. Shaft 569 drives bevel gears 573, 575, shaft 579 and a pointer 577 which coacts with numerals 598 of a dial 173 to display to the customer the grade number of the fuel which the machine has been set to deliver.

OPERATION OF PREDETERMINED STOP MECHANISM

The following is a brief description of the operation of the selector, motor control, stop and follower mechanisms designated generally by numerals 143, 411, 159, 167 and 413 of FIGURES 1 and 20.

It is assumed that nine predeterminer gear segments 479, 499 (FIG. 13) have been attached to each of the stop plates 469, 491 respectively as will be described; that the previous delivery had been of the number 1 fuel (Lofuel) and that a delivery is to be made of number 3 fuel.

The first act to be performed by the operator is that of turning knob 369 (FIGS. 1, 14 and 15) until indicator 371 indicates the fuel number 3. The indicator is centered exactly on this number by the roller detent device 373, 375 (FIG. 16). This action renders the proper one of the price and the proper one of the blend predeterminers effective.

Cam 425 (FIG. 18) will have been rotated clockwise so that switch 431 occupies the deep notch 429. This sets switch 433 to condition the circuit of the motor 145 to drive the ratio setting mechanism of blend variator 99 in a ratio decreasing direction and 97 in an increasing direction toward the ratio settings required to deliver the selected blend at the corresponding price. The price mechanism of the cost variator 131 is thus ready to be moved in a price increasing direction and the price and blend predetermining means (stop plates 469, 491 and gear segments) move clockwise (FIG. 13), in synchronism with the respective variator ratio setting mechanisms.

Knob 369 also rotates the radial notch 451 of disc 443 (FIG. 19) clockwise, as viewed from the bottom of FIG. 14, two tenths of a revolution with respect to projection 457 on follower gear 453, thereby rendering one of each set of predetermining means effective. The gear 453 is held stationary by gear 561 and detent mechanism 589. The disc is also displaced axially from gear 453 to close the stop switch 465.

The motor 145 will not start until the usual control lever 710 (FIGS. 1 and 3) is operated as will be described. This lever actuates certain switch means, as will be described, to energize the solenoid 392 which rotates pawl 387 (FIG. 16) into engagement with the ratchet 385, to prevent further rotation of knob 369 as well be described.

When motor 145 starts, the teeth of the predeterminer segments 479, 499 which are engaged with the depending teeth of pinions 555, 557 (FIG. 13) will move clockwise simultaneously until they are freed from the pinions, because the price and blend stop plates are both driven from the two outputs of the same differential 147 (FIG. 11) and they are geared together by the pinions and segments as just described. As soon as the segments clear the pinions however, which occurs during a one eighth rotation of the pinions, the stop plate which is driven by the least loaded output of the differential 147 will advance clockwise (FIG. 13) until the leading tooth of the next segment on the moving stop plate strikes the depending tooth of the corresponding pinion, and is stopped thereby because rotation of the pinion is prevented by the detent mechanism 587. The other stop plate will then advance until its next segment engages the corresponding pinion, whereupon, both stop plates will now drive the pinions, overcome the resistance of the detent mechanism and rotate the pinions an additional one eighth turn. The detent roller 593 moves out of one notch and into the next on each one eighth rotation of the pinions so as to set the depending teeth thereof in a vertical position each time, in the path of the advancing predeterminer segments of the respective stop plates.

Further upon each one eigth rotation of the pinions as described, the shaft 549 will rotate the gear 453 clockwise, as viewed from the bottom (FIG. 14), by means of pinion 561 which is fixed to the pinion shaft 549 and will advance the lug 457 toward the notch 451, which was displaced by the rotation of knob 369, one quarter of the distance between them (since the notch was moved two full steps).

Since the pinions 555, 557 have, as described, made one quarter of a revolution, the lug 457 has covered half the distance toward the notch 451 and, since switch 465 remains closed, the stop plates continue to move. They will rotate the pinions a one eighth revolution to free the engaged segments from the pinions, will advance in the manner described above until the teeth of the next predeterminer on each plate, which is the one which has been rendered effective by the selectively operable means, engage the respective pinions, will rotate the pinions another one eighth revolution and the lug another one fourth revolution. This aligns the lug with the notch so that spring 459 moves the disc 443 toward gear 453 and switch 465 is reversed thereby opening contacts 465A to deenergize the motor 145. Contacts 465B of switch 465 are now closed.

It will thus be seen that when the selector knob was advanced two steps to grade 3 selecting position, the pinion shaft 549 was respectively rotated ⅛, ¼ and ⅛ revolution by the originally engaged predeterminer segments, the intermediate set of segments and the effective segments corresponding to grade 3. Also the half revolution of the shaft as described, drove the 8 to 20 gearing 561, 453 so that gear 453 advanced ²⁄₁₀ revolution which was the amount of the displacement of knob 369 and disc 443. Also the gear train 174' (FIG. 20) from shaft 549 to the pointer 577 of the customer blend indicator 173 has a ratio of 8 to 20 so that the the ½ revolution of shaft caused a ²⁄₁₀ revolution of pointer 577 and the customer indicator will show that the proper blend setting has been established.

The operation of the price variator 113 has also set the unit price indicator 141 to display the proper unit price for the blend.

Also, during the operation of the blend stop plate 491 as described, the valve lever 113 has been prepositioned as previously described to open the Hifuel valve 35 and to throttle the Lofuel valve 19 to the approximate settings required for delivering the constituents of the blend in the proper proportions.

PRESETTING PRICE AND BLEND PREDETERMINERS OR SEGMENTS

In order to simplify the mounting or presetting of the predeterminers or gears segments 479, 499 on the price and blend stop plates 469, 491 respectively, an arrow 470 (FIG. 13B) is applied to the blend stop plate 491 and, when the variators 99, 97 have been rotated to the 100%–0% settings, the blend stop plate is positioned so that the arrow points directly at the depending, vertically positioned tooth of pinion 557.

Assuming that this has been done and that the parts occupy the positions corresponding to those required to deliver the number 1 fuel (Lofuel) as described above, the first predeterminer or gear segment 499 is mounted on the blend stop plate with its teeth straddling the positioned tooth of pinion 557 and is fastened to the stop plate by a screw which enters the hole 497, in the outer row which is bisected by the arrow.

Since as indicated above, the blend stop plate is rotated clockwise (FIGS. 13 and 13B) to reduce the setting on the variator 99, it follows that the predeterminers or segments for the other fuels numbered 2, 3 etc. will have to be attached to this plate at increasing distances from and to the left of the arrow 470, that is in a counterclockwise direction from the arrow in FIGURE 13. The installation of the predeterminers 499 are, of course, made with the price stop plate and gear removed from the machine.

The hole 497 or 498 of the blend stop plate which is to be aligned with the hole 500 or 501 of the predeterminer or segment for the other fuels is determined by counting to the left from the screw of the first predeterminer or segment. Thus if fuel No. 2 is to contain 8% Hifuel, since the space between adjacent holes of the outer row represents 1%, we need merely to count 8 holes to the left (FIG. 13) from the arrow in the outer row, position the second segment so that it overlies this hole 497 and fasten the segment to the plate.

The remaining segments are similarly located and attached to the plate in accordance with the percentages of Hifuel to be used in the respective blends. Should any percentage setting involve a half percent, the 1% units will be counted in the outer row and the ½% will be counted by locating the segment in the hole in the inner row which is immediately adjacent and counterclockwise from the last counted hole in the outer row.

When the highest fuel, No. 10 is 100% Hifuel and 0% Lofuel, the first segment, which is the one set over the arrow will also represent the Hifuel so that only nine segments are needed. However, if fuel No. 10 is a blend, a tenth segment will have to be installed at the proper hole.

Figure 21:
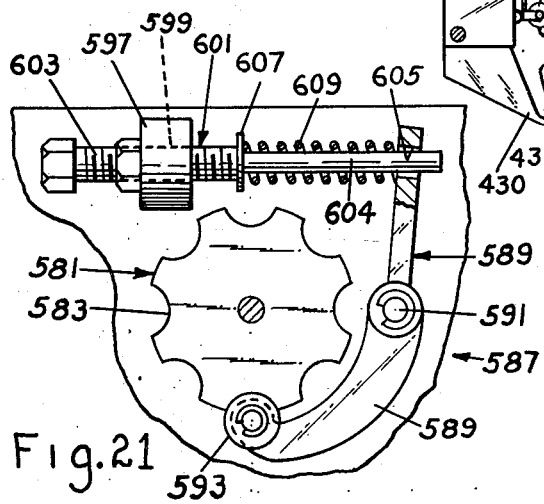
FIGURE 21 is an elevation taken on the line 21—21 of FIGURE 14 showing the detent device for the stop mechanism.
Figure 28:
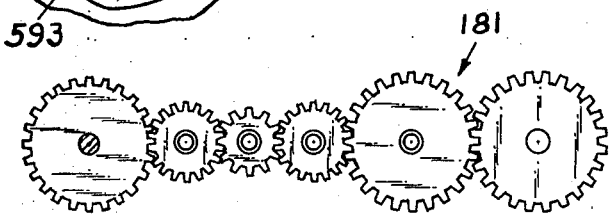
FIGURE 28 is a plan view of the gear train connecting the reset mechanism with the reset shaft of the cost and gallons registers taken on the line 28—28 of FIGURE 3.

After the required nine or ten predeterminers or segments have been mounted on the blend stop plate, the price stop plate 469 (without segments) and its associated large gear 467 may be mounted on the stud (FIG. 20) and the nut 509 and washer 510 may be tightened. Both stop plates are rotatable on the stud however, the blend stop plate is held in its initial position by the detent mechanism 587 (FIG. 21).

Since the parts occupy the position for the number 1 fuel, it is obvious that the unit price indicator 141 (FIG. 1) must display the unit price of the number 1 fuel. Accordingly, the price stop plate 469 and its gear 467 may be manually rotated in the direction required to post the price of the No. 1 grade on 141. Alternatively, a manually operable, single-pole, double-throw switch 800 (FIG. 29) may be provided which will energize the blend and price setting motor 145 in either direction and this switch may be used to run the price variator 131 and unit price indicator 141 in the proper direction until the price for the No. 1 fuel appears on 141.

When this setting is completed, the first, predeterminer 479 is attached to the price stop plate 469 so that its teeth straddle the positioned tooth of the pinion 555. The screw 485 will enter a hole 475 or 477 in the outer or inner row, depending on the price of the No. 1 fuel.

When the first predeterminer has been installed, the next one is positioned by counting the holes counterclockwise from the hole in which the screw of the first segment was mounted, from one row to the other and back again. Also, if fuel No. 10 is the Hifuel and the price of this fuel is 20¢ more than the Lofuel, the full range of the price will be used and only nine segments will be required for the ten fuels, the predeterminer for the Lofuel will in that case also serve as that for the Hifuel. However, if the entire 20¢ range is not required, a tenth predeterminer will be required for the Hifuel price.

The price differential from a hole in one row to an adjacent hole in the other row is 1/10¢.

As an example, assume that the full available range of both the blend and price stop plates are used; that the No. 1 and No. 10 fuels are 100% Lofuel and Hifuel respectively; that the price of each fuel is equal to the percentage of Hifuel used and multiplied by the spread (20¢) and that the price of the Lofuel is 25¢/gallon. Under such conditions the prices and the predeterminer or segment predeterminer settings on the stop plates are indicated by the following table, the holes in the stop plates being counted in both rows.

*Table 1*

| Fuel No. | Percent Hifuel | Blend Stop Hole No. | Price, ¢/gallon | Price Stop Hole No. | Segment Blend No. | Price |
|---|---|---|---|---|---|---|
| 1 | 0 | 0 (Arrow) | 25.0 | 0 | 1 | 1 |
| 2 | 8 | 16 | 26.6 | 916 | 2 | 2 |
| 3 | 17 | 34 | 28.4 | 34 | 3 | 3 |
| 4 | 25 | 50 | 30.0 | 50 | 4 | 4 |
| 5 | 40 | 80 | 33.0 | 80 | 5 | 5 |
| 6 | 55 | 110 | 36.0 | 110 | 6 | 6 |
| 7 | 68 | 136 | 38.6 | 136 | 7 | 8 |
| 8 | 73 | 146 | 39.6 | 146 | 8 | 9 |
| 9 | 82½ | 165 | 41.5 | 165 | 9 | 7 |
| 10 | 100 | 0 | 45.0 | 0 | 1 | 1 |

This presetting of the predeterminers is shown in FIGURE 13. It should be added that the percentage of Hifuel used in the various blends is established by the manufacturer of the fuel.

If desired, a uniform or any other price differential may be maintained between the prices of the various fuels so long as the total spread of 20¢ is not exceeded and so long as the price differential between grades is five tenths of a cent or more. An example of a uniform price differential setting which uses the same Hifuel percentages but does not use the entire 20¢ price spread is given in Table 2.

*Table 2*

| Fuel No. | Percent Hifuel | Blend Stop Hole No. | Price, ¢/gallon | Price Stop Hole No. | Segment Blend No. | Price |
|---|---|---|---|---|---|---|
| 1 | 0 | 0 (Arrow) | 25.0 | 0 | 1 | 1 |
| 2 | 8 | 16 | 26.5 | 15 | 2 | 2 |
| 3 | 17 | 34 | 28.0 | 30 | 3 | 3 |
| 4 | 25 | 50 | 29.5 | 45 | 4 | 4 |
| 5 | 40 | 80 | 31.0 | 60 | 5 | 5 |
| 6 | 55 | 110 | 32.5 | 75 | 6 | 6 |
| 7 | 68 | 136 | 34.0 | 90 | 7 | 7 |
| 8 | 73 | 146 | 35.5 | 105 | 8 | 8 |
| 9 | 82½ | 165 | 37.0 | 120 | 9 | 9 |
| 10 | 100 | 0 | 38.5 | 135 | 1 | 10 |

In this case an additional or tenth predeterminer or segment is required for the price stop plate. The price differential between blends is 1.5¢ so that the price range is only 13.5¢ over the entire range of fuels.

It is of course obvious that the blend range need not extend over the full 100% of which the machine is capable. Neither is it necessary to dispense either or both the Hifuel or Lofuel. Table 3 discloses another possible arrangement of sectors in which the No. 1 and No. 10 fuels are blends and the blend interval is 8% and the price interval between blends is 1.5 cents.

*Table 3*

| Fuel No. | Percent Hifuel | Blend Stop Hole No. | Price, ¢/gallon | Price Stop Hole No. | Segment Blend No. | Price |
|---|---|---|---|---|---|---|
| 1 | 8 | 16 | 26.5 | 15 | 1 | 1 |
| 2 | 16 | 32 | 28.0 | 30 | 2 | 2 |
| 3 | 24 | 48 | 29.5 | 45 | 3 | 3 |
| 4 | 32 | 64 | 31.0 | 60 | 4 | 4 |
| 5 | 40 | 80 | 32.5 | 75 | 5 | 5 |
| 6 | 48 | 96 | 34.0 | 90 | 6 | 6 |
| 7 | 56 | 112 | 35.5 | 105 | 7 | 7 |
| 8 | 64 | 127 | 37.0 | 120 | 8 | 8 |
| 9 | 72 | 144 | 395 | 135 | 9 | 9 |
| 10 | 80 | 160 | 41.0 | 150 | 10 | 10 |

While numerous other examples could be cited, the above tables illustrate various general patterns for presetting or installation of the predeterminers on the stop plates to provide the delivery of any of a number of fuels having predetermined constituent percentages at a predetermined price for each fuel by means of motorized setting mechanisms.

GALLONS TOTALIZER

Shaft 81 of the Lofuel meter 17 (FIGS. 13A and 11) rotates clockwise (FIG. 11) at a speed of four revolutions per gallon and has fixed to it a 64 tooth gear 80. This gear drives a 32 tooth gear 84 which is fixed to a 64 tooth gear 86 and which drives a 20 tooth gear 100 to which is fixed a 10 tooth sun gear 98 of the differential mechanism 85. Sun gear 98 drives a 20 tooth planet gear 96 which is integral with a 10 tooth planetary gear 94 which drives the output sun gear 102 and output shaft 91 of the differential in a clockwise direction (FIGURE 11) also at 4 r.p.g.

Similarly the shaft 87 of the Hifuel meter is rotated clockwise at four revolutions per gallon and drives 64 tooth gear 88, which drives 32 tooth gear 90 which is fixed to 64 tooth gear 88, which drives the 96 tooth planetary carrier gear 92 on which the planetary pinons 94, 96 are mounted. Thus four clockwise revolutions of the shaft 87 will produce four clockwise revolutions of sun gear 102 and the output shaft 91. The total rotations of each of the meter output shafts are thus summed up by the differential mechanism and are transmitted to the cost variator 131.

REGISTERS

The cost and gallons registers 139 and 95 may be ordinary resettable decimal registers having at least three numeral wheels. A typical register of this type is shown in FIGURE 30 in which the first, lowest order numeral wheel has an outer, numeral bearing rim 140 which is fixed to a radial web 142. The web has a pawl 144 pivotally mounted therein for engagement with a V-groove 146 formed in a reset shaft 177 or 179 depending on which counter is considered. The wheel also has an annular ratchet 148 extending inwardly from its periphery for engagement by a pawl 166 which is carried by a hub 168 which rotates on the reset shaft and which extends through the web 142 which rotates on it. The parts described, except the reset shaft, are assembled as a unit on the shaft.

One end of the hub is provided with notches 169 which are engaged by the projection of a drive collar 170. The latter is also rotatably mounted on the reset shaft and carries a gear 161. The input shaft 172 of the register drives a worm 174 through the gearing 175.

As the worm rotates clockwise (viewed from the top) gear 161, drive collar 170 and pawl 166 all rotate clockwise to drive the ratchet 148 and numeral wheel 140 in an advancing direction. The reset pawl 144 rides idly on the reset shaft which is stationary.

When it is desired to reset the register, the shaft 176 is rotated clockwise as viewed from the left of FIGURE 30 so that groove 146 will pick up the pawl 144 and advance the numeral wheel. At this time the ratchet 148 moves idly past the pawl 166 which, with the hub, collar 170 and the drive gearing, remains stationary.

The wheel has the usual stepping teeth 178 and locking ring 180 which coact with the usual transfer gear 181. The latter drives a gear (not shown) which is fixed to the hub 168 of the next order wheel instead of being driven by a collar as described above.

REGISTER RESETTING DRIVE MEANS

Figure 27:
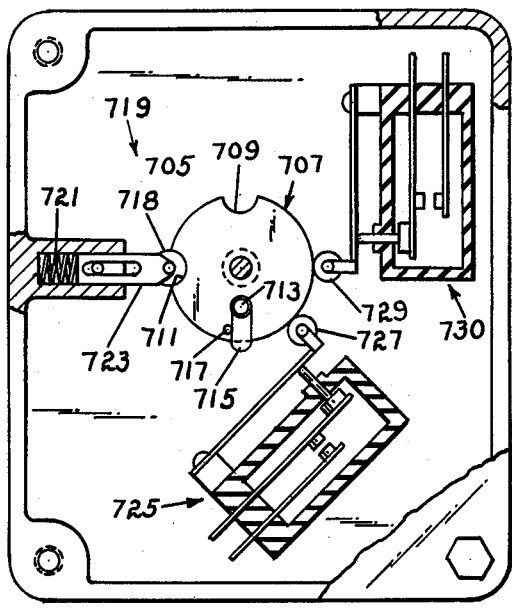
FIGURE 27 is a section taken on the line 27—27 of FIGURE 3 showing the switching mechanism which is operated by the hose hook lever.
Figure 26:
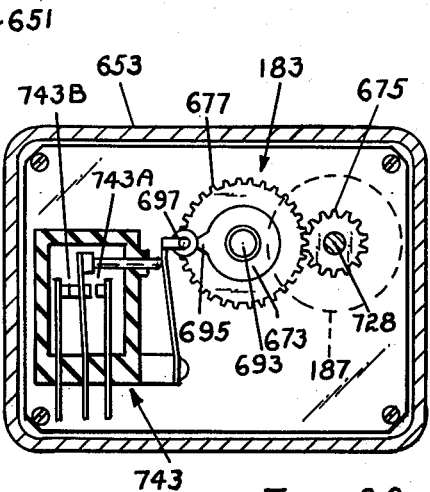
FIGURE 26 is a section of the register reset mechanism taken on the line 26—26 of FIGURE 3.

Referring to FIGURES 1, 26 and 27, it will be seen that the control lever 710 when it is rotated counterclockwise when viewed from the left of FIGURE 1 rotates shaft 705 (FIG. 27) in a similar direction. The shaft enters an explosion proof switch box 651 and carries a cam disc 707 which is provided with two notches 709, 711 which are spaced 90 degrees. The disc carries a pin 713 on the side diametrically opposite from notch 709, on which is pivotally mounted a switch actuating arm 715. A stop 717 limits the clockwise rotation of arm 715 about its pin to a radial position as shown.

A detent roller 718 is normally held engaged in notch 711 by a spring 721 which acts on a plunger 723 on the free end of which the roller is journalled.

A normally open switch 725 is mounted in the box and has its actuating roller 727 disposed to ride on the disc 707 at a point between the arm 715 and the roller 729 of a second normally open similar switch 730 which is located diametrically opposite the detent roller 718.

Switch 725 is referred to as a "bump switch" for reasons which will appear below. Suitable stop means, not shown may be provided for limiting the rotation of the control lever 710 to the 90 degree rotation necessary to permit the detent roll 718 to engage one or the other of the notches 709, 711.

A second explosion proof box 653 (FIGS. 1 and 26) is provided for housing a mechanism indicated generally by 183 which includes a resetting motor 187 and its control switch 743. As shown in FIG. 26, the motor drives a pinion 675 which, in turn, drives a gear 677, shaft 693 and cam 673 which is provided with a lobe 695.

The switch 743 is a single-pole double-throw switch in which contacts 743A are normally closed while 743B are normally open. However, when the actuator 697 of the switch is displaced to the left by the cam lobe as shown in FIG. 26, contacts 743A are open and 743B are closed.

As previously stated, shaft 728 of motor 187 is connected by spur gearing 181 and bevel gearing 180 to the reset shafts 177, 179 so that for one revolution of gear 677, cam 673 and shaft 693, the respective reset shafts 177 and 179 will be rotated exactly two revolutions in the forward direction so that their respective register wheels will be zeroized.

ELECTRIC SEQUENCE CONTROL CIRCUITS

Figure 29:
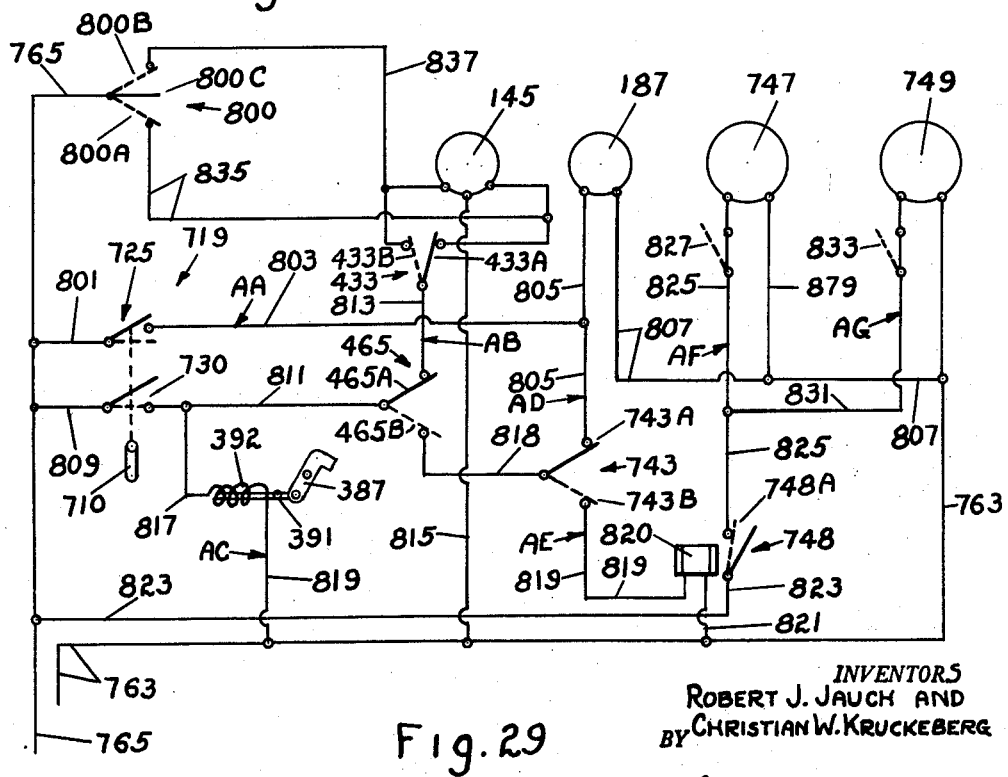
FIGURE 29 is a circuit diagram of the electrical controls.

The electric control circuits for this dispenser are shown in the wiring diagram, FIGURE 29, which shows the supply mains 763 and 765.

These circuits insure that the various mechanisms will be operated in a predetermined sequence and that the apparatus cannot be operated improperly, either intentionally or accidentally, so as to cheat the customer.

The switches 730, 725, 433, 465 and 743 have already been described as have the motors 145 and 187. The switch 800 is a double pole three position manually operable switch which is disposed within the housing and is solely for the purpose of providing means for energizing the price setting motor to turn the price and blend stop plates and to move the blend and price variators when the price and blend segments are being attached to the stop plates. This function could be performed by hand if desired and the switch could be omitted.

The solenoid 392 is connected to actuate the link 391 of the blend setting interlock pawl 387 to lock the knob 369 against rotation once the dispensing control lever 710 is moved to its dispensing position.

A normally open relay 748 is provided for holding the circuits to the dispensing motors 747, 749 open until the price and blend settings and the resetting of the registers has been completed.

It will be seen that the "bump switch" 725 is closed only momentarily as the disc 707 rotates counterclockwise (FIG. 27). This occurs when arm 715 strikes the switch actuator 727 and the switch reopens as soon as the arm passes the roller and moves on to actuate the roller 729 to close switch 730. On the clockwise rotation of the disc and lever 710, the arm pivots on its pin and the "bump switch" is not actuated.

Thus for the period during which switch 725 is closed, a *circuit AA* will be closed from main 765 through wire 801, switch 725, wires 803, 805 to the reset motor 187 and through wire 807 to main 763.

This momentary closure of switch 725 is sufficient to energize or "bump" the reset motor 187 long enough for the cam lobe 695 to move out of contact with actuator roller 697 (FIG. 26) so that contacts 743B will open and 743A will close, as shown in FIG. 29.

It will be recalled that when the blend setting was made to select fuel 3, the price and blend setting direction switch 433 was set so that its contacts 433A were closed. Also the price and blend stop switch 465 was set so that its contacts 465A were closed. Consequently, when the main switch 730 (FIG. 27) is closed by arm 715 upon full rotation of the control lever 710 and disc 707 through 90 degrees counterclockwise, there will be closed

*Circuit AB* from main 765 through wire 809, switch 730, wire 811, contacts 465A, wire 813, contacts 433A, blend and price set motor 145, wire 815 to main 763.

Coincidentally therewith, switch 730 closes a branch *circuit AC* from wire 811, through the wire 817, interlock solenoid 392 and wire 819 to main 763. This prevents rotation of the blend selecting knob 369.

The price and blend setting motor 145 continues to operate until the projection 457 becomes aligned with notch 451 of disc 443 (FIG. 14) whereupon switch 465 shifts to open contacts 465A and close contacts 465B. This extends the main 765 through

*Circuit AD* from contacts 465B through wire 818, contacts 743A, wire 805, Reset motor 187 and wire 807 to main 763. The reset motor will restart, will complete a single revolution of shaft 693 and cam 673 and will also complete two revolutions of the register reset shafts 177, 179 to restore the cost and gallons registers 139, 95 to zero. At the end of the full revolution of cam 673 (FIG. 26) the cam lobe opens 695 contacts 743A and closes contacts 743B. The reset motor is deenergized and the contacts 743B extend the power supply to

*Circuit AE* from contacts 743B through wire 819, coil 820 of relay 748 and wire 821 to main 763. Energization of coil 820 closes the relay contacts 748A and extends

*Circuit AF* from main 765, through a branch 823 directly attached to the main, relay contacts 748A, wire 825, limit switch 827, Lofuel pump motor 747, wire 879 and wire 807 to main 763 and also by way of

*Circuit AG* from relay contacts 748A through wires 825–831, limit switch 833 and Hifuel pump motor 749 directly to main 763.

The limit switches 827 and 833 are for the purpose of preventing operation of the Hifuel motor 747 when only Lofuel is being dispensed, that is while the selector knob 369 is set to Fuel No. 1 and similarly for preventing the Lofuel motor from operating when the knob is set to dispense all Hifuel as it would when set to fuel No. 10. Of course both switches must be closed to dispense any of the blends. For this reason they are normally closed switches which must be held open.

It is obvious that the switches may be actuated by the arms 397, 401 which actuate the respective limit valves 189, 195 (FIG. 16). However, they may also be operated by the valve control lever 113 (FIG. 13) as shown in the latter figure. Since the proportioning valve 123 moves downwardly to its full open position in which it delivers maximum flow of Hifuel, it follows that the arm of lever 113 must be rotated counterclockwise (FIG. 13) to so open the valve and that in so doing it must open the limit switch 827 of the Lofuel pump to prevent its operation. Clockwise rotation of lever 113 to its fullest extent will likewise open the switch 833 of the Hifuel motor 749.

Thus the dispensing of one or both of the constituent fuels is started and continues until either the nozzle is closed, in which case the pump motors continue to run or until the control lever is restored to its initial position, which it must be, before the hose nozzle can be restored to the nozzle support. As is well known, the control lever, in its dispensing position blocks the nozzle support so as to prevent the nozzle from being mounted thereon.

When the control lever is restored to its initial or "off position," switch 730 is opened and interrupts *circuits AC* to the interlock solenoid 392, and *circuit AE* through the relay coil 821.

This results in the contacts 748A of the relay 748 opening to break *circuit AF* to the Lofuel motor and *circuit AG* to the Hifuel motor.

Should the control lever be again moved to its dispensing position without operating the blend selector knob, the previously selected blend will be dispensed without any actuation of the price and blend selector motor 145. This occurs because switch 465 has not been actuated by the knob 369 and consequently its contacts 465B remain closed. Accordingly, since the "bump switch" 725 has caused cam 673 to rotate far enough to close contacts 743A before switch 730 was closed, such closure of 730 causes immediate energization of circuit AD to operate the reset motor 187 which, upon completion of its cycle, causes the relay 748 to be energized and it energizes the pump motor or motors as described above.

As was indicated above the switch 800 is movable manually in either direction from its neutral position 800C to close either contacts 800A or 800B. In the 800A position, it extends main 765 through wire 835 to the same side of the price-blend setting motor which is connected to contacts 433A so that it will produce the same direction of rotation of motor 145 as said contacts do. In the 800B position, the contacts extend the main through the wire 837 to the same side of motor 145 as the contacts 433B and will cause a reverse rotation of said motor just as said contacts would. Thus the price and blend variator can be run up and down by reversing switch 800, to check the positional accuracy of the predeterminers installed on the price stop plate against the limit price indicators 141 (FIG. 1).

A similar register 839 (FIG. 1) can be mounted on the blend variator 99 to permit an accuracy check to be made against the setting of the blend segments.

OPERATION

Summarizing the operation of the device, it will be seen that the operator must first see that the knob 369 is set so that the pointer 371 indicates the number of the fuel to be dispensed. Assuming that the knob has been rotated to a new setting, the direction in which the knob is turned determines the direction in which the blend and price variators will be driven by motor 145. If the knob is not moved, there is no need for the motor to operate.

He will next remove the nozzle 71 from its support 841 and will rotate the control lever 710 from its vertical position as shown in FIGS. 1 and 3, counterclockwise to a substantially horizontal position overlying the nozzle support.

Such movement first actuates the "bump switch" 725 and then the switch 730, and the motor 145 starts, if a new setting of knob 369 has been made. The blend and price variators are operated to the required settings, the valve lever 113 is prepositioned and when these functions have been completed, the register motor 187 starts and resets the registers to zero.

When resetting is completed, the pump motor or motors required to deliver the fuel are started and the required fuel or fuels are supplied to the nozzle, under pressure so as to be delivered to the vehicle tank as soon as the nozzle is opened by the operator.

The nozzle is reclosed as soon as the required amount of fuel has been dispensed and the operator is compelled to return the control lever 710 to its vertical position in order to be able to restore the nozzle to its support. Such actuation of lever 710 opens switch 730 and the pump motors stop.

The setting of the knob 369 after the rotation of the control lever to its dispensing position is prevented by the latch pawl 387 which is held in latching position by solenoid 392. In the event the operator fails to make the proper setting of the knob before rotating the control lever, he must return the lever to its "off" position before he can actuate the knob. When the proper fuel selection has been made, he can move the lever to its "on" position and the apparatus will recycle as described.

The customer and operator can at all times see the dial 173 which displays the number of the fuel being dispensed, the unit price register 141 which shows the price of the product, the total gallons register 95 and the cost register 139 to insure that the quantity, money value and total quantity of the particular fuel ordered complies with that being dispensed.

MODIFIED SELECTOR MECHANISM

A modified selector mechanism is shown in FIGS. 22 to 25. The one previously described provides for ten different fuels, comprising Hifuel, Lofuel and eight blends thereof. It may be desirable to dispense Hifuel, Lofuel and one or more but less than eight blends. This can be done with the previously described mechanism but the fuel numbers shown on dial 357, but not used, would have to be blanked out. Thus in a five fuel pattern comprising fuels 1, 3, 5, 7 and 10, predeterminers or gear segments would have to be provided on the price and blend stop plates for all ten fuels in order to get the required number of actuations of the gear 453 (FIG. 14) to cause the lug 457 to catch up with the notch 451 in disc 443. There is a possibility that the operator might set the selector to a blanked number, in which case an improper delivery could be made although the pointer 577 would indicate that the setting was improper.

In order to eliminate the necessity for blanking out fuel numbers, the dial 350 may be provided with a pair of tapped holes 861, 863 lying on opposite sides of each side of each fuel number position. A stop pin 865 may be screwed into the hole 861 which lies to the left of the number 1 fuel position and a similar pin 867 in the hole 863 adjacent the number 5 fuel (in a five fuel pattern) as shown in FIG. 22.

These stops coact with the pointer 371 to prevent it from being rotated counterclockwise beyond the number 1 position or clockwise beyond the number 5 position.

In the five fuel pattern, the blend and price stop plates 491, 469 will require only five predeterminers or segments to be attached instead of ten. The price stop plate 469 with five segments 479 is shown in FIG. 23. The method of installing the segments is exactly the same as previously described.

In order that the number 1 fuel may be the Lofuel and the number 5 fuel be the Hifuel, it is necessary to make the cams 193, 199 (FIG. 17) for controlling the pilot valves 189, 191 rotationally adjustable relative to each other.

This is accomplished (FIGS. 24 and 25) by attaching a hub 869 to the shaft 363 by a pin 871. The hub carries a radial disc 873 having ten equally spaced holes 875 therein disposed so as to correspond to the fuel number positions. The Lofuel cam 877 has a hub 879 which rides on hub 869 and carries a pin 881 which is located relative to the cam notch 883 so that with the pin 881 entered in a hole 875, the notch will receive the pilot valve roller 403 at the time the pointer 371 is set to number 1 fuel: A spring 885 bears on the ratchet 385 and on the cam 877 to hold the latter against the disc with the pin 881 in the hole 875.

The Hifuel cam 887 is similarly provided with a pin 889 which enters one of the holes and which is located with respect to the cam notch 891 so that the notch will receive the roller 399 when the pointer indicates a corresponding fuel number.

The cam is provided with a hub 893 which rides rotatably on hub 869 and is held in engagement with the disc by a spring 895. The latter bears on a snap ring 897.

As shown in FIG. 24, the cam notches are arranged so that in the five fuel pattern, the number 1 and 5 fuels will be Lofuel and Hifuel respectively while fuels 2, 3 and 4 will be blends of the two in predetermined proportions.

If the fuel pattern requires either fuel number 1 or 5 or both to be a blend, there will be no need to close the corresponding pilot valves and the cams can be rotated so that they will not align with the respective rollers 399, 403 in any of the five positions of the pointer 371.

Thus the mechanism described enables patterns of different numbers of fuels to be set up on the machine which patterns may include the Hifuel, Lofuel, both or neither.

The operation of the dispenser is otherwise the same as described in detail above and it is not believed necessary to repeat the description of operation.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. A speed variator comprising a frame, a plurality of spindles mounted in said frame, parallel to each other and comprising first and last spindles disposed adjacent to each other and a plurality of intermediate spindles, said spindles extending in a circular pattern, from said first to said last spindle, a shaft, means operatively connecting said shaft to drive said first spindle, a reducing gear set for each intermediate spindle, operatively connecting such spindle to be driven by the spindle preceding it in said pattern, a drive control mechanism for each spindle including an input element operatively connected to be driven by said spindle and an output element, and mechanism having an activated condition in which the input element drives the output element and having a normal condition in which said drive is interrupted, selecting means, adapted to coact with any one of said mechanisms, said selecting means being settable to coact with and thereby render any one of said mechanisms active, and a rotatable output member operatively connected with all of said output elements so as to be rotated by the output element of the active mechanism.

2. The structure defined by claim 1 wherein said selecting means includes a selector member mounted for rotation on the frame and said member having means for engaging said drive control mechanisms in succession as said member rotates, to render the engaged mechanism active.

3. The structure defined by claim 1 wherein said drive control mechanisms each comprise a differential having a second, freely rotatable output element and wherein said selecting means includes means engageable with said second output element to stop the rotation thereof so as to activate the mechanism.

4. The structure defined by claim 3 wherein each second output element includes a starwheel operatively connected for rotation therewith and said selecting means includes a rotatable selector member having a stop adapted to engage said starwheels individually, to hold the engaged starwheel against rotation.

5. The structure defined by claim 1 wherein the last spindle is not driven and wherein the gear sets connecting said intermediate spindles to be driven by the respective preceding spindles having ratios such that the speed of each spindle is a function of a numerical factor expressed by the formula $$N\left(1 - \frac{n}{N}\right)$$

wherein N is the total number of spindles and $n$ is the number of the spindle determined by counting said highest speed spindle as number 1 and proceeding through said intermediate spindles toward said last spindle, to the spindle to be counted.

6. The structure defined by claim 5 which includes ten spindles.

7. The structure defined by claim 5 which includes measuring means operatively connected to drive said shaft at a predetermined number of revolutions per unit measure, expressed as $XR/U$, and means operatively connecting said shaft to drive one of said spindles in the ratio of $n/X$ where $n$ is the number of the driven spindle.

8. A compound speed variator comprising two of the variators defined by claim 1, said compound variator comprising an adding differential mechanism having a first input element operatively connected to be rotated by output member of one variator, a second input element operatively connected to be rotated by the output member of a second variator and a final output element.

9. A compound speed variator comprising first, second and third variators each as defined by claim 1, a first adding differential mechanism having first and second input elements operatively connected to be rotated by the output members of said first and second variators respectively and having an output element, and a second adding differential mechanism having first and second input elements operatively connected to be driven by the output element of said additional differential mechanism, and by the output member of said third variator respectively, and having a final output element.

10. The structure defined by claim 9 wherein the input elements of the corresponding drive control mechanisms of the three variators are operatively connected to be driven by the same spindle.

11. A compound speed variator comprising first, second and third variators having a common set of ten spindles arranged, equally spaced, in a circular pattern, means including a shaft operatively connected for driving said spindles, in order, at relative speeds which are functions of numerical factors of from nine to zero respectively, each variator comprising a drive control mechanism for each spindle, said mechanism comprising an input element operatively connected to be driven by the spindle and an output element, said mechanism having an activated condition in which the input element drives the output element and having a normal condition in which said mechanism is ineffective, selecting means adapted to coact with any one of said mechanisms, said selecting means being settable to coact with and thereby render any one of said mechanisms active, and output means including a rotatable output member connected with all of said output elements so as to be rotated by the output element of the active mechanism, first and second adding differentials each having two input means and an output means, means connecting the input means of the first adding differential respectively with the output members of two of said variators and the input means of the second adding differential respectively with the output member of the remaining variator and with the output means of the first differential, said output means and differentials being constructed to modify the output speeds of the active mechanisms of the first, second and third variators in the ratio of 1:100, 1:10 and 1:1 respectively and to drive the output means of the second adding differential in accordance with the sum of such modified speeds.

12. The structure defined by claim 11 which includes an adjustable indicator for each variator having numerals nine to zero, means operatively connected with said selecting means and operable in time therewith for adjusting said indicators to display the numerals corresponding to the numerical factors of the active drive control mechanisms of said variators.

13. The structure defined by claim 11 wherein the selecting means of said first, second and third variators comprise first, second and third selector members respectively, rotatably mounted on said frame for rotation relative to the drive control mechanisms of the respective variators to successively activate said mechanisms, and means for rotating said selector members to select the mechanisms to be activated.

14. The structure defined by claim 11 wherein the selecting means of said first, second and third variators comprise first, second and third selector members respectively, rotatably mounted on said frame, means for driving the first selector member, first and second stepping mechanisms connected to be driven by said first and second selector members and connected to rotate said second and third selector members respectively, through one tenth of a revolution each time said first and second selector members respectively, complete a revolution.

15. The structure defined by claim 14 wherein said stepping mechanisms are constructed to rotate said second and third selector members when the corresponding first and second selector members pass between the positions in which they activate the drive control mechanisms of the spindles having speeds corresponding to the numerical factors nine and zero.

16. The structure defined by claim 14 wherein the means for driving said first selector member comprises a reversible motor and means for selectively energizing the motor for driving said selector members in either of two directions.

17. A compound speed variator comprising first, second and third variators having a common set of ten spindles arranged, equally spaced, in a circular pattern, means including a shaft for driving said spindles, in order, at speeds each of which is a function of a different, fixed numerical factor, each variator comprising a drive control mechanism for each spindle, said mechanism comprising an input element driven by the spindle and an output element, said mechanism having an activated condition in which the input element drives the output element and having a normal condition in which said mechanism is ineffective, selecting means adapted to coact with any one of said mechanisms, output means including a rotatable output member operatively connected with all of said output elements so as to be rotated by the output element of the active mechanism, first and second adding differentials each having two input means and an output means, means operatively connecting the input means of the first adding differential respectively with the output members of two of said variators and the input means of the second adding differential respectively with the output member of the remaining variator and with the output means of the first differential, said output means and adding differentials being constructed to modify the output speeds of the active mechanisms of the first, second and third variators in the ratio of 1:100, 1:10 and 1:1 respectively and to drive the output means of the second adding differential in accordance with the sum of such modified speeds.

18. The structure defined by claim 17 wherein the fixed numerical factors for said successive spindles vary from nine to zero in steps of one.

19. The structure defined by claim 17 wherein the range of the compound speed variator is varied by providing the third variator with a lesser number of drive control mechanisms than there are spindles, said mechanisms being provided for the spindles having the smaller numerical factors.

20. The structure defined by claim 19 wherein only the spindles of the third variator having numerical factors of zero and one are provided with drive control mechanisms to provide a range of ratios from zero to 1.99 in increments of .01.

21. The structure defined by claim 17 wherein each drive control mechanism comprises a differential having a second output element which is freely rotatable in said normal condition, a starwheel connected to be driven by said output element and wherein said selecting means of each variator comprises a ring gear, rotatably mounted on said frame, and having a stop disposed for movement successively into individual locking engagement with said starwheels as said ring gear is rotated in either direction and means for rotating the ring gear of each variator to lock a selected one of the starwheels thereof.

22. The structure defined by claim 21 wherein the numerical factors are from zero to 9 in increments of 1 and which includes means for indexing the ring gears of the second and third variators to position their respective stops in engagement with an adjacent starwheel each time the stops of the first and second ring gears respectively pass between the starwheels of the spindles having numerical factors of zero and nine.

23. A speed variator comprising an input shaft and a final output means, and speed variating means operatively connected to be driven from said input shaft and means operatively connecting said variating means to drive said final output means, said speed variating means being adjustable to any of a number of successive ratios having values corresponding to an arithmetic progression of numbers, rotary ratio selecting means adapted to coact with said variating means for adjusting it to any one of said ratios, a number of normally ineffective predetermining means each of which includes rotary means presettable to preselect a ratio of said variating means, selectively operable means for rendering one of said predetermining means effective, means for rotating said ratio selecting means and said presettable means in synchronism and means responsive to said effective predetermining means for stopping said rotating means when said speed variating means reaches said preselected ratio.

24. The structure defined by claim 23 wherein said speed variating means comprises a number of individual ratio variators each of which is adjustable to any of a number of successive ratios corresponding to an arithmetic progression of numbers of one decimal order, wherein said means connecting said variating means to drive said final output means includes means for additively combining the outputs of said ratio variators as successive decimal orders constituting the numbers of the arithmetic progression of said speed variating means and wherein said rotary selecting means comprises means for adjusting each ratio variator.

25. The structure defined by claim 24 which includes at least three individual variators and wherein said numbers of the arithmetic progression of said speed variating means are three digit numbers, each digit of which represents the numerical value of the selected ratio of a different one of said three ratio variators.

26. A compound speed variator comprising an input shaft and a final output means, a number of individual speed variating means operatively connected to be driven from said shaft, said speed variating means each being adjustable to any of a number of successive ratios having values corresponding to an arithmetic progression of numerical factors and including rotary ratio selecting means adapted to coact therewith for adjusting it to any one of said ratios, means for additively compounding the output of each speed variator in predetermined proportions with the output of each other variator to drive said final output means, a number of normally ineffective predetermining means each of which includes rotary means presettable to preselect a group of ratios comprising one ratio of each of said variating means, selectively operable means to render one of said predetermining means effective, means for rotating said ratio selecting means and the presettable means of said effective predetermining means in synchronism, and means responsive to said effective predetermining means for stopping said rotating means when said speed variating means reach said preselected group of ratios.

27. A compound speed variator comprising a frame, first, second and third variators having a common set of ten spindles arranged, equally spaced, in a circular pattern on said frame, means including a shaft for driving said spindles, in order, at speeds each of which is a function of a different, fixed numerical factor, each variator comprising a drive control mechanism for each spindle, said mechanism comprising an input element driven by the spindle and an output element, said mechanism having an activated condition in which the input element drives the output element and having a normal condition in which said mechanism is ineffective, comprising selecting means adapted to coact with all of said mechanisms and movable relative thereto to different positions to activate said mechanisms individually, and comprising output means including a rotatable output member operatively connected with all of said output elements so as to be rotated by the output element of the active mechanism, first and second adding differentials each having two input means and an output means, means operatively connecting the input means of the first differential respectively with the output members of two of said variators and the input means of the second differential respectively with the output member of the remaining variator and with the output means of the first differential, means for moving the selecting means of said variators, actuable means for stopping said selecting means with a preselected one of a number of different groups of drive control mechanisms activated, each of said groups consisting of one drive control mechanism of each of the variators, means for predetermining the drive control mechanisms constituting each group, and manually controlled means for preselecting a group, said predetermining means being movable in synchronism with said selecting means to actuate said stopping means.

28. The structure defined by claim 27 wherein said predetermining means comprises rotary means operatively connected to be moved in synchronism with said selecting means, trip means mounted on said rotary means and extending therefrom, means for connecting said trip means to said rotary means in different positions relative thereto, corresponding to the positions to be occupied by the selecting means for each group, said trip means when connected, being rotated in synchronism with said rotary and selecting means, and follower means disposed on said frame for coaction with said trip means during the rotation thereof to actuate said stopping means when the selecting means reach the positions corresponding to the selected group.

29. A compound speed variator comprising an input shaft, first, second and third ratio variators each having a rotatable output element, each being operatively connected to be driven by said shaft and each having ratio selecting means movable to establish the ratio of said variator at any value of from 9 to 0 in steps of 1, a first adding differential operatively connected to be driven by the output elements of two of said ratio variators and having an output means, a second adding differential operatively connected to be driven by the output elements of the remaining variator and by said output means and having a final output means, means including said output element and said differentials for modifying the output speeds of said first, second and third variators in the proportions of 1:100, 1:10 and 1:1 respectively, as reflected at said final output means, means for moving said ratio selecting means, a number of normally ineffective predetermining means, each of which is individually presettable to preselect a group of ratios, comprising one ratio of each variator, manually operable means for rendering any one of said predetermining means effective and means cooperating with said effective predeterminer for stopping said selecting means when the ratios of said variators correspond to the ratios preselected by said effectively predetermining means.

30. The structure defined by claim 29 which includes a motor for moving said ratio selecting means.

31. The structure defined by claim 29 wherein said predetermining means comprise rotary means operatively connected to be rotated in synchronism with said ratio selecting means, presettable means adapted to be disposed at different angular positions relative to said rotary means and to be connected therewith in any of said positions for rotation thereby, said stopping means comprising actuable means, fixedly located, angularly with respect to said rotary means, said rotary means supporting said presettable means for movement into cooperative relation with respect to said actuable means as said rotary means rotates.

32. A speed control mechanism for first and second prime movers each having an output shaft rotatable in proportion to the speed thereof, said mechanism comprising means for varying the speeds of said prime movers, first and second variators each comprising an input shaft, a final output means and speed variating means connected to be driven from said input shaft and connected to drive said output means, means connecting the output and input shafts of said first prime mover and variator, and of said second prime mover and variator respectively, said speed variating means being adjustable to any of a number of successive ratios having values corresponding to an arithmetic progression of numbers, rotary ratio selecting means operatively associated with said variating means for adjusting it to any one of said ratios, means connecting the ratio selecting means of said first and second variators for simultaneous rotation in opposite directions so that the sum of the values of the ratios of the two variators, when either is adjusted to a ratio intermediate the first and last ratios, is constant, a subtractive differential having first and second input means connected with said final output means of said first and second variators respectively and an output connected to actuate said speed varying means of said prime movers so as to maintain product of the speed of the first prime mover and the ratio of the first variator equal to that of the speed of the second prime mover and the ratio of the second variator.

33. The structure defined by claim 32 which includes additional means operatively associated with said subtractive differential and connected for operation in synchronism with said ratio selecting means for presetting said speed varying means.

34. The structure defined by claim 32 which includes a second differential having a first input connected with the final output of one of said variators, an output connected to one input of said subtractive differential and means connected for operation in synchronism with the ratio selecting means of one of said variators and connected to the input of said second differential for activating said subtractive differential to position the speed varying means to cause said prime movers to operate at approximately the speeds required for said selected ratio.

35. The structure defined by claim 32 wherein said progression of numbers starts with zero and terminates with the number preceding 100, wherein 100 is an exact multiple of interval between adjacent numbers and wherein the last ratio beyond the terminal number is zero.

36. The structure defined by claim 35 wherein the interval between adjacent numbers of the progression is five tenths.

37. The structure defined by claim 32 which includes a number of normally ineffective predetermining means each of which includes rotary means presettable to preselect a ratio of one of said variators, selectively operable means for rendering one of said predetermining means effective, means for rotating said ratio selecting means and said presettable means in synchronism, and means responsive to said effective predetermining means for stopping said rotating means when said speed variating means reaches the preselected ratio.

38. The structure defined by claim 32 which includes a third variator, an additive differential having two inputs connected to be driven respectively by the output shafts of said prime movers and having its output connected to drive the input shaft of said third variator, a register connected to be driven by the output means of said third variator, a number of first and a number of second normally ineffective predetermining means operatively associated with said first and third variator respectively, said predetermining means each including rotary means presettable to preselect a ratio of the associated variator, selectively settable means for rendering one of said first and one of said second predetermining means effective, means for rotating the ratio selecting means and presettable means of said first and third variators respectively, in synchronism and means responsive to both of said effective predetermining means for stopping said rotating means when said first and third variators both reach the respective preselected ratios.

39. The structure defined by claim 38 wherein said means for rotating the ratio selecting and presettable means includes a differential having an input and two outputs connected respectively to drive the selecting and presettable means of said first and third variators, wherein the rotary means comprises a blend stop plate and a price stop plate, and said presettable means comprise gear sectors removably mounted thereon at different angularly spaced positions comparable to different preselected ratios of said first and third variators and wherein said means responsive to said predetermining means comprises first and second gears disposed in the path of the sectors of said blend and price stop plates respectively, yieldable detent means for preventing actuation of said gears until they are both engaged by a sector of the respective stop plates.

40. The structure defined by claim 39 wherein said selectively settable means comprises means having a stop position and which is manually displaceable therefrom in distinct steps and means operable by said gears for returning said means toward its stop position one half step for each actuation of said gears by said sectors.

41. The structure defined by claim 38 wherein said register is a cost register, said structure also including a quantity register and means connecting the output of said additive differential to drive said quantity register.

42. The structure defined by claim 38 wherein said means for rotating the selecting and presettable means includes a motor, an additional differential connected to be driven by the motor and having first and second outputs, means connecting said outputs respectively to drive the ratio selecting and presettable means of said first and third variators respectively.

43. A speed control mechanism for first and second fluid meters each having an output shaft rotatable in proportion to the rate of flow through the meter, said mechanism comprising valve means communicating with said meters and adjustable between first and second limit positions in which the flow from first and second meters are respectively substantially zero, valve operating means for moving said valve means toward said limit positions, first and second variators each having a final output means and comprising a speed variating means connected to be driven by the output shaft of said first and second meters respectively and connected to drive said final output means, said speed variating means being adjustable to any of a number of successive ratios having values corresponding to an arithmetic progression of numbers, ratio selecting means operatively associated with each variating means for adjusting it to any one of said ratios, means connecting the ratio selecting means of said variators for simultaneous movements in opposite directions so that the sum of the selected ratios is constant, intermediate the end ratios, a subtractive differential having first and second inputs connected to be driven by the final output means of said first and second variators and having an output member connected to operate said valve operating means, so as to maintain the speeds of the output means of said variators equal and limit means operable by said valve operating means when said valve means approaches a limit position for stopping the flow through both meters.

44. The structure defined by claim 43 which includes first and second motor pumps connected to supply said first and second meters respectively, first and second, normally closed limit switch connected to control said first and second motor pumps, means responsive to the adjustment of said valve means to the first and second limit positions for opening said first and second limit switch respectively.

45. The structure defined by claim 43 wherein the value of the first and last ratios of both of said variators is zero, and which includes selectively settable means for preselecting any one of said ratios, means for operating said ratio selecting means to adjust said variating means to the preselected ratio and additional limit means, operable by said selectively settable means when it is set to preselect the first ratio for stopping the flow through one of said meters, and for stopping the flow through the other meter when it is set to preselect the last ratio.

46. The structure defined by claim 43 wherein said limit means includes a motorized valve communicating with each meter, and a motor control device for each valve, said device having normal and operated conditions corresponding to closed and open conditions of the associated motorized valve, said valve operating means including means for holding said devices operated except when said valve means approach a limit position.

47. The structure defined by claim 46 wherein said motorized valve comprises a hydraulic motor and said motor control device comprises a pilot valve and which includes means for supplying pressure fluid to said pilot valve and said motor.

48. A fluid proportioning and dispensing apparatus comprising two fluid meters, means including a pump for supplying a different fluid to each meter, proportioning means for controlling the relative speeds of said meters to maintain the flow therethrough in a selected proportion, said proportioning means including proportioning variator means settable to different ratios, and connected to be driven by said meters, cost variator means and a resettable quantity register connected to be driven by the meters in proportion to the sum of the meter speeds, said cost variator means being settable to different ratios corresponding to different unit prices, a resettable total cost register connected to be driven by said cost variator means, predetermining means including means presettable to preselect a number of different corresponding ratios of said proportioning and cost variator means, selectively settable means for selecting a particular ratio of said proportioning variator means with the corresponding ratio of the cost variator means, control means operable between stop and start positions, sequencing means, responsive to the operation of said control means to the start position, for setting said proportioning and cost variator means to the selected ratios, for resetting said cost and quantity registers and for starting said pumps in that order.

49. The sructure defined by claim 48, which includes means responsive to the operation of said control means to the start position for preventing operation of said selectively settable means.

50. The structure defined by claim 48 wherein said sequencing means includes electric motor means for setting said variator means and for resetting said registers.

51. The structure defined by claim 48 wherein said selectively settable means is movable in two directions and said sequencing means includes a reversible motor, and means responsive to the direction of movement of said selectively settable means for conditioning said motor to operate in a corresponding direction.

52. The structure defined by claim 48 which includes means operable by said selectively settable means for indicating the setting thereof and means operable in synchronism with said variating means for indicating the settings thereof when such settings are established by said sequencing means.

References Cited in the file of this patent

UNITED STATES PATENTS

| | | |
|---|---|---|
| 922,880 | Garvin et al. | May 25, 1909 |
| 2,323,373 | Bugg | July 6, 1943 |
| 2,323,374 | Bugg | July 6, 1943 |
| 2,472,478 | Hinds | June 7, 1949 |
| 2,973,118 | Grise | Feb. 28, 1961 |
| 2,996,221 | Grise | Aug. 15, 1961 |